(12) United States Patent
Nakashima

(10) Patent No.: US 12,030,454 B2
(45) Date of Patent: Jul. 9, 2024

(54) AIRBAG DEVICE

(71) Applicant: Autoliv Development AB, Vargarda (SE)

(72) Inventor: Atsushi Nakashima, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 18/041,036

(22) PCT Filed: Aug. 10, 2021

(86) PCT No.: PCT/JP2021/029535
§ 371 (c)(1),
(2) Date: Feb. 8, 2023

(87) PCT Pub. No.: WO2022/034884
PCT Pub. Date: Feb. 17, 2022

(65) Prior Publication Data
US 2024/0010157 A1    Jan. 11, 2024

(30) Foreign Application Priority Data
Aug. 11, 2020 (JP) ................................. 2020-135543

(51) Int. Cl.
*B60R 21/232* (2011.01)
*B60R 21/203* (2006.01)

(52) U.S. Cl.
CPC .......... *B60R 21/232* (2013.01); *B60R 21/203* (2013.01)

(58) Field of Classification Search
CPC ............................. B60R 21/232; B60R 21/203
See application file for complete search history.

(56) References Cited

U.S. PATENT DOCUMENTS 9,296,360 B2 * 3/2016 Komamura ........... B60R 21/276
9,469,269 B2 * 10/2016 Hiruta ................... B60R 21/231
9,994,186 B2 * 6/2018 Fukawatase .......... B60R 21/203
(Continued)

FOREIGN PATENT DOCUMENTS

JP    2007-196856 A    8/2007
JP    2016-28932 A    3/2016
(Continued)

OTHER PUBLICATIONS

Japanese Office Action regarding Patent Application No. 2022542855, dated Jul. 31, 2023.

*Primary Examiner* — Faye M Fleming
(74) *Attorney, Agent, or Firm* — Harness, Dickey & Pierce, P.L.C.; Stephen T. Olson

(57) ABSTRACT

An airbag device includes a driver airbag cushion and a curtain airbag cushion. The curtain airbag cushion includes a first seam portion formed so as to extend vertically within a range in which the driver airbag cushion is projected outward in the vehicle width direction, a first chamber expanding so as to be thicker in the vehicle width direction than the first seam portion on the front side of the first seam portion, and a second chamber expanding so as to be thicker in the vehicle width direction than the first seam portion on the rear side of the first seam portion. The driver airbag cushion is expanded and deployed in a state separated from the first chamber while being in contact with a curved portion of the second chamber that is curved toward the first seam portion.

20 Claims, 26 Drawing Sheets

(56) References Cited

U.S. PATENT DOCUMENTS

| | | | |
|---|---|---|---|
| 10,501,044 B2* | 12/2019 | Moon | B60R 21/214 |
| 10,870,407 B2* | 12/2020 | Jung | B60R 21/232 |
| 2016/0200281 A1* | 7/2016 | Takeshita | B62D 1/11 |
| | | | 280/730.2 |
| 2018/0162311 A1 | 6/2018 | Moon | |
| 2018/0354448 A1* | 12/2018 | Moon | B60R 21/232 |

FOREIGN PATENT DOCUMENTS

| | | |
|---|---|---|
| JP | 2016-130043 A | 7/2016 |
| JP | 2017-56802 A | 3/2017 |
| JP | 2018-75962 A | 5/2018 |

\* cited by examiner

[FIG. 1]
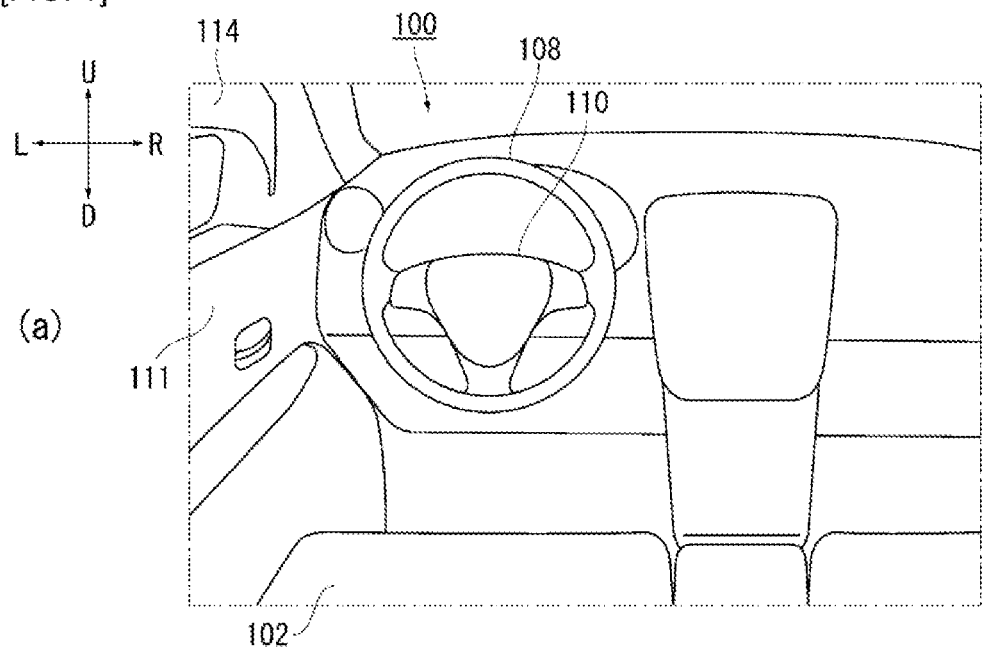
(a)
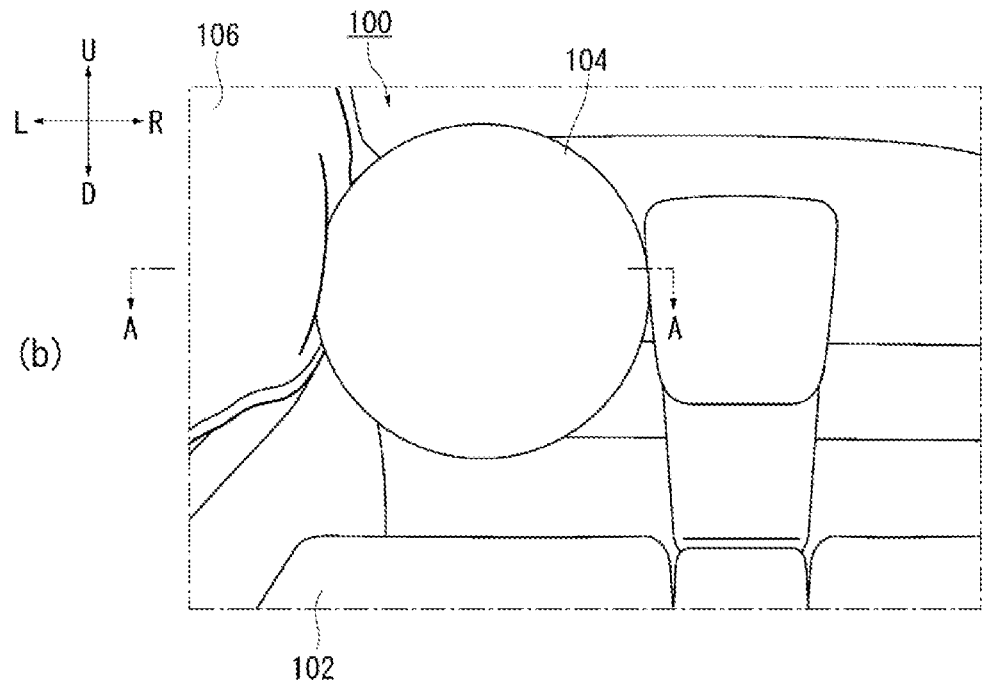
(b)

[FIG. 2]
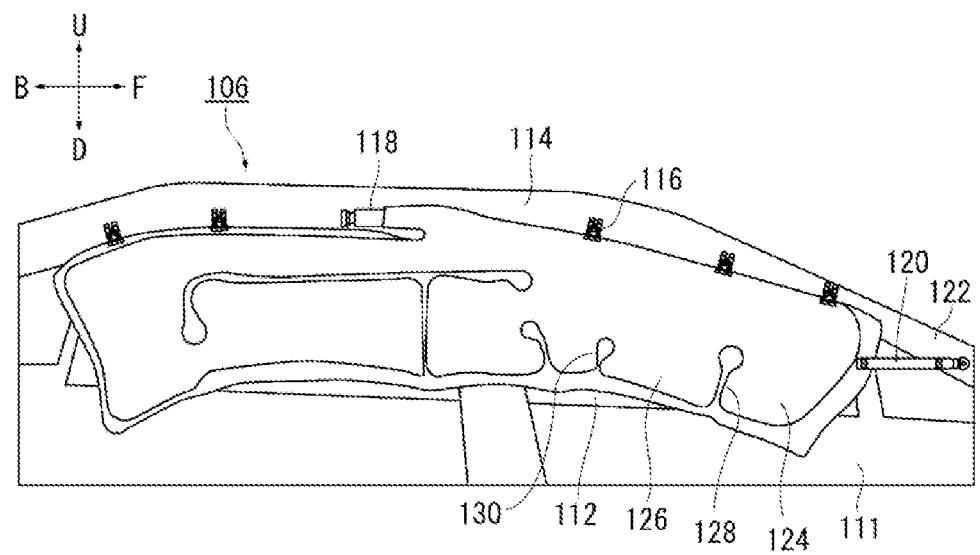
(a)
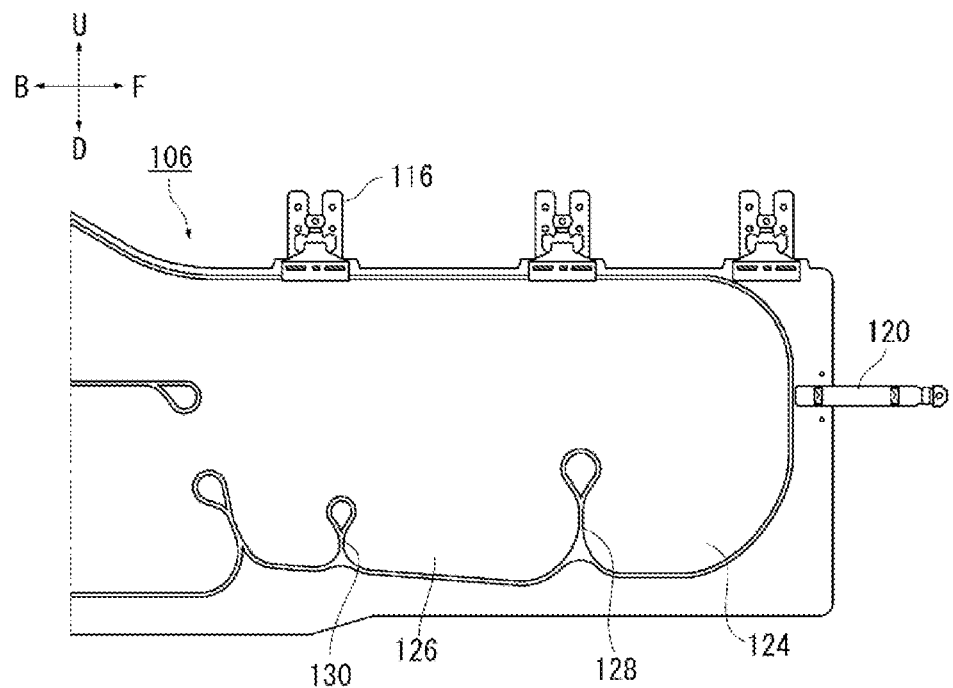
(b)

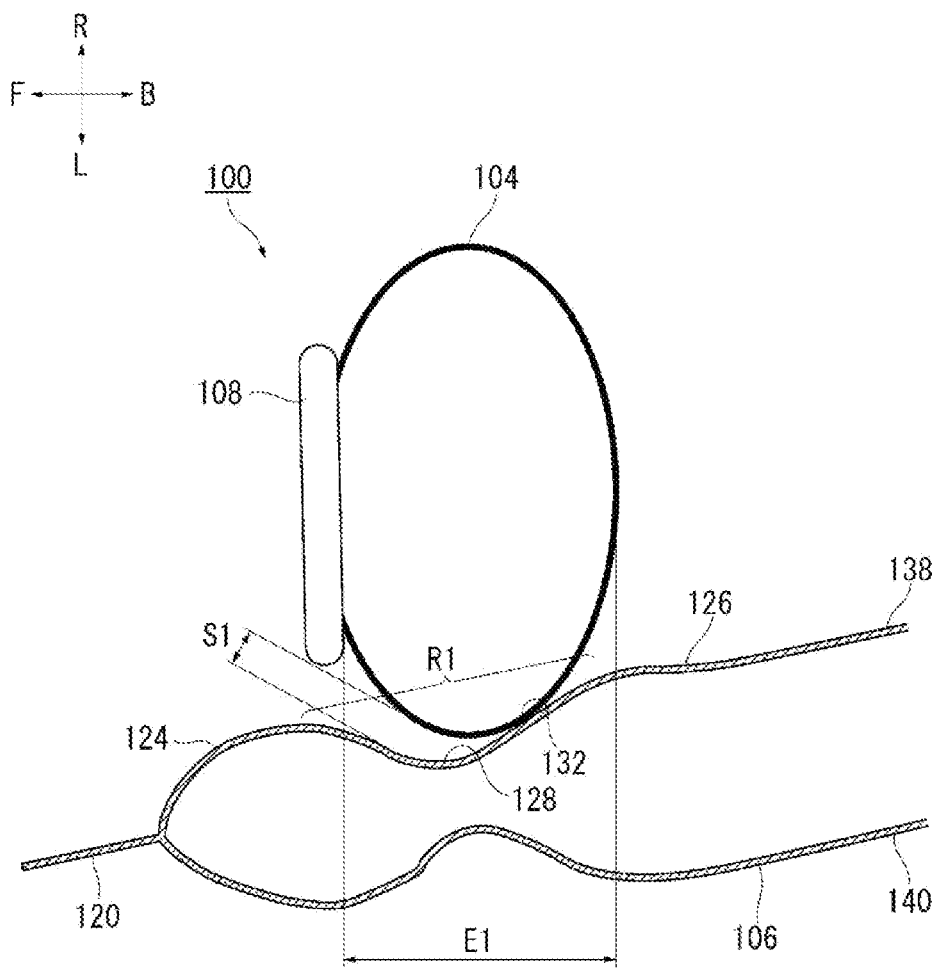
[FIG. 3]
A-A cross section

[FIG. 4]
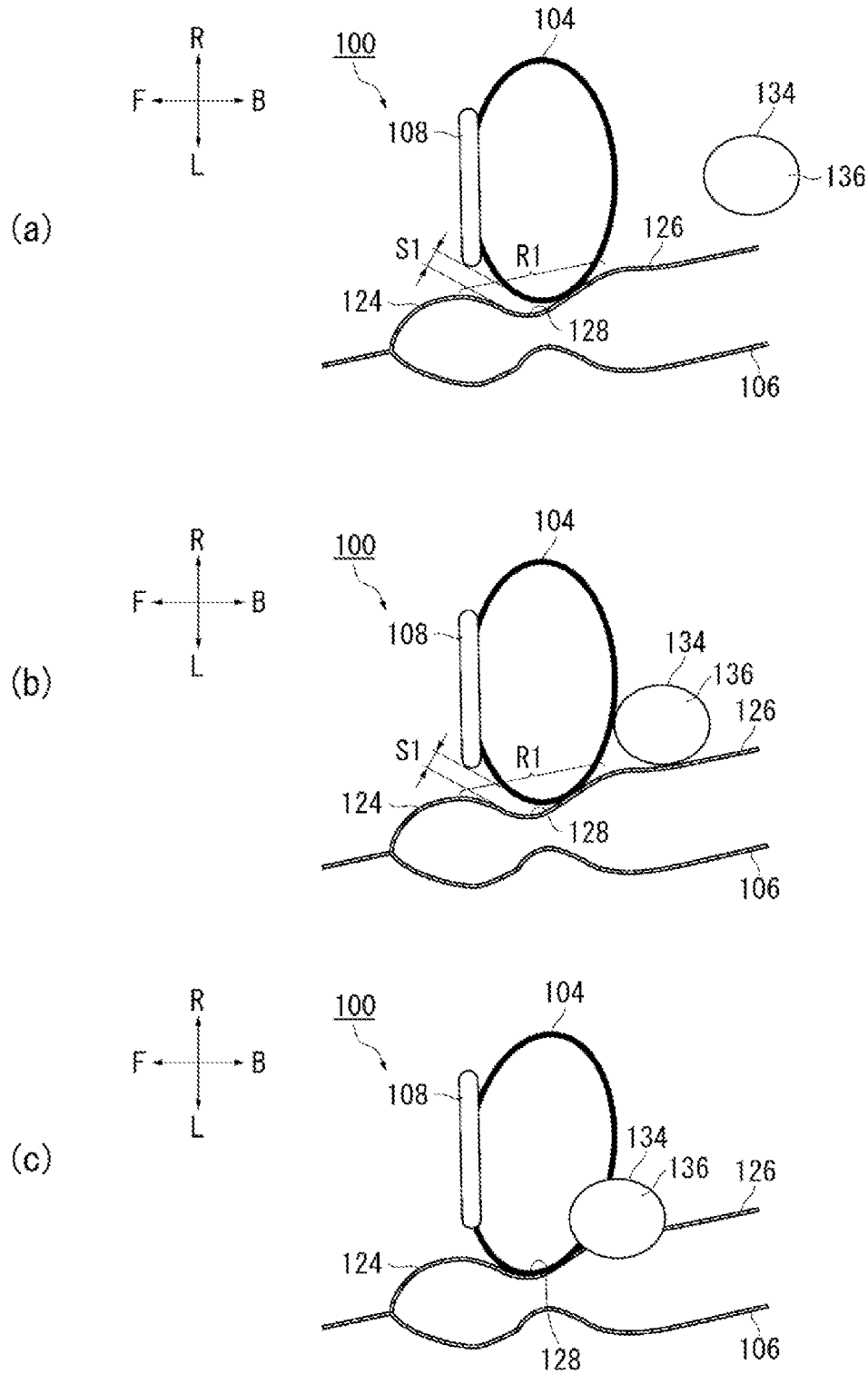

[FIG. 5]
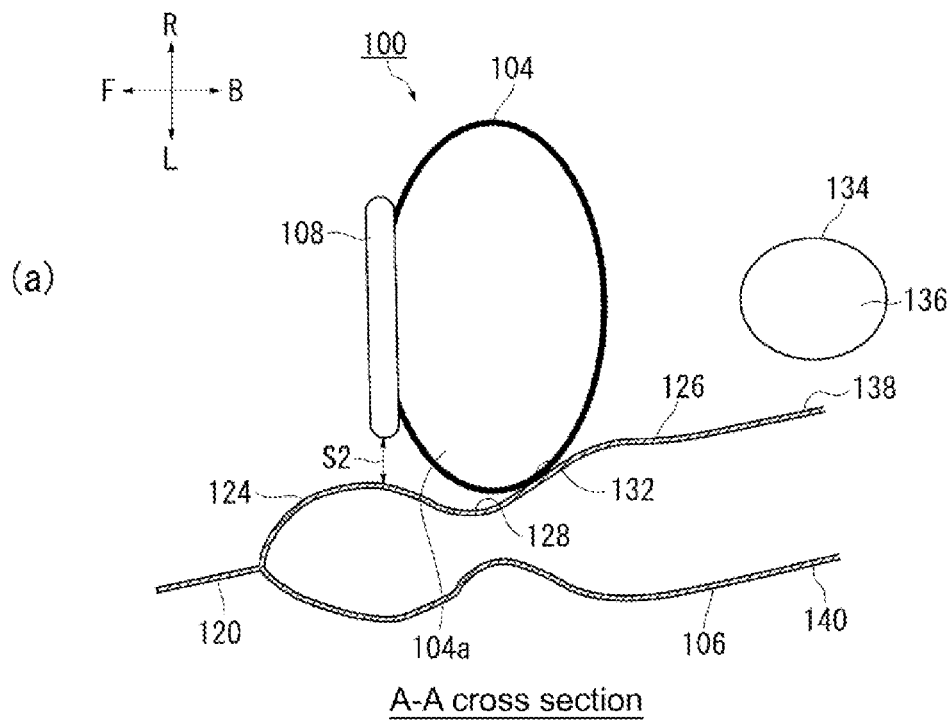
(a)
A-A cross section
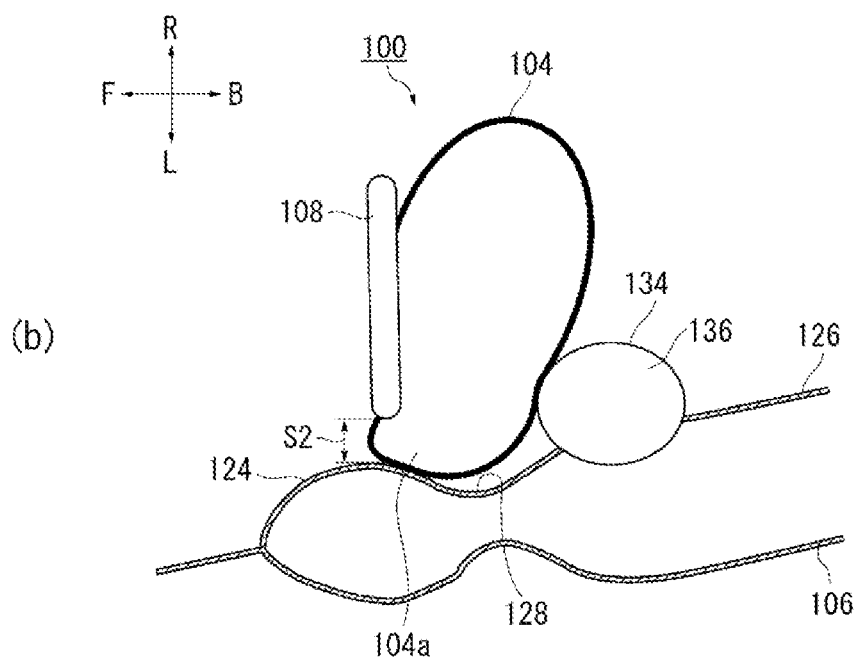
(b)

[FIG. 6]
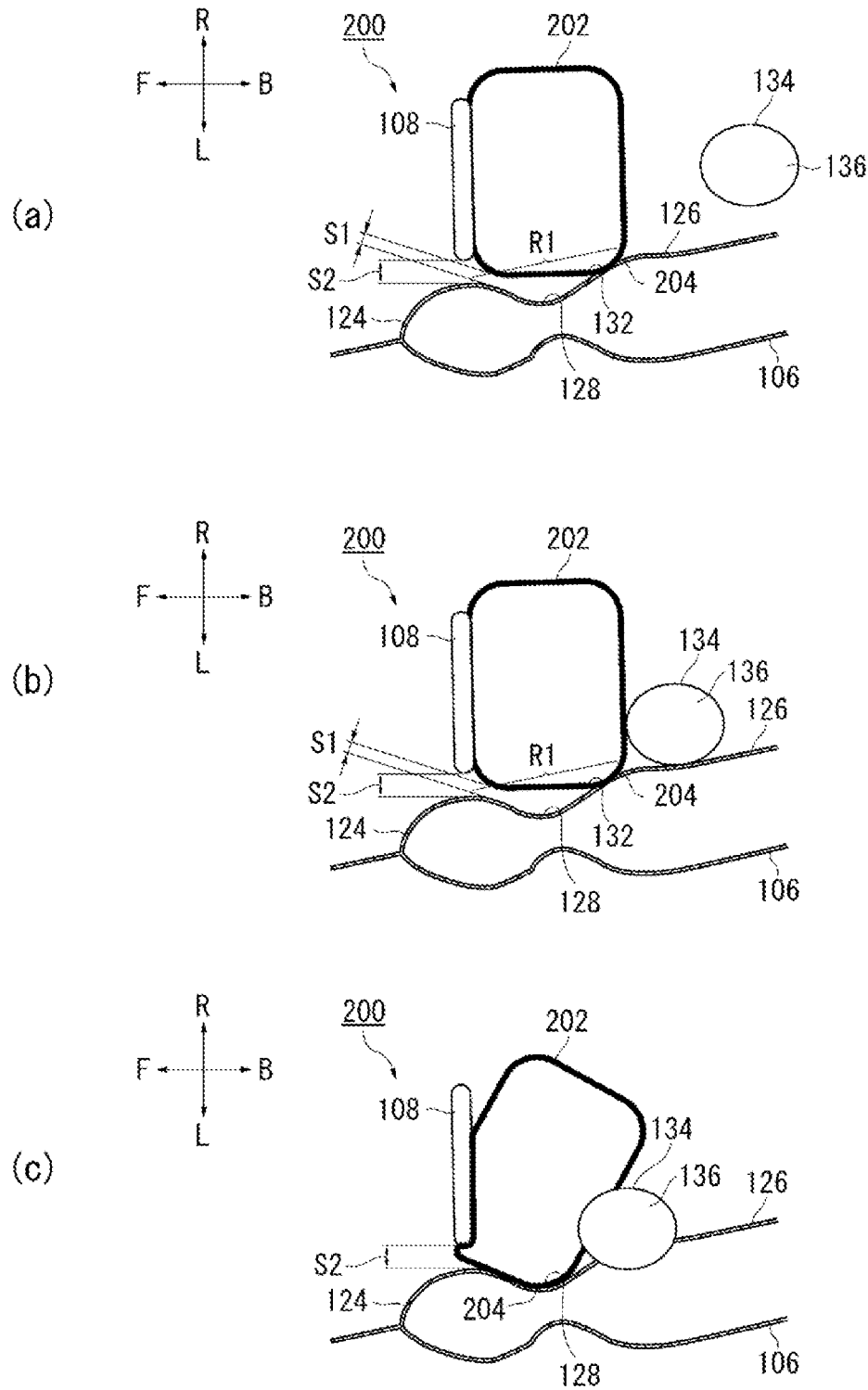

[FIG. 7]
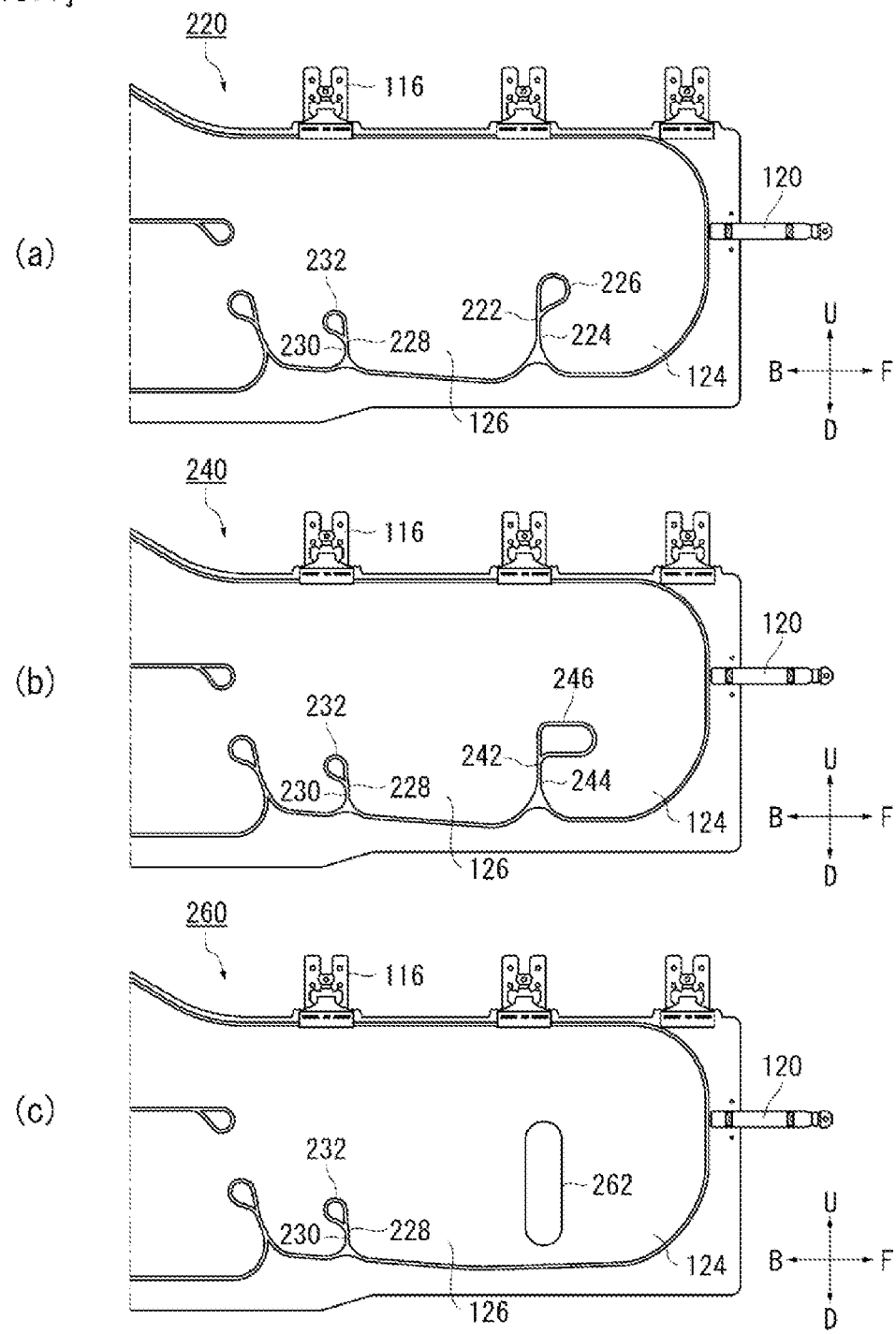

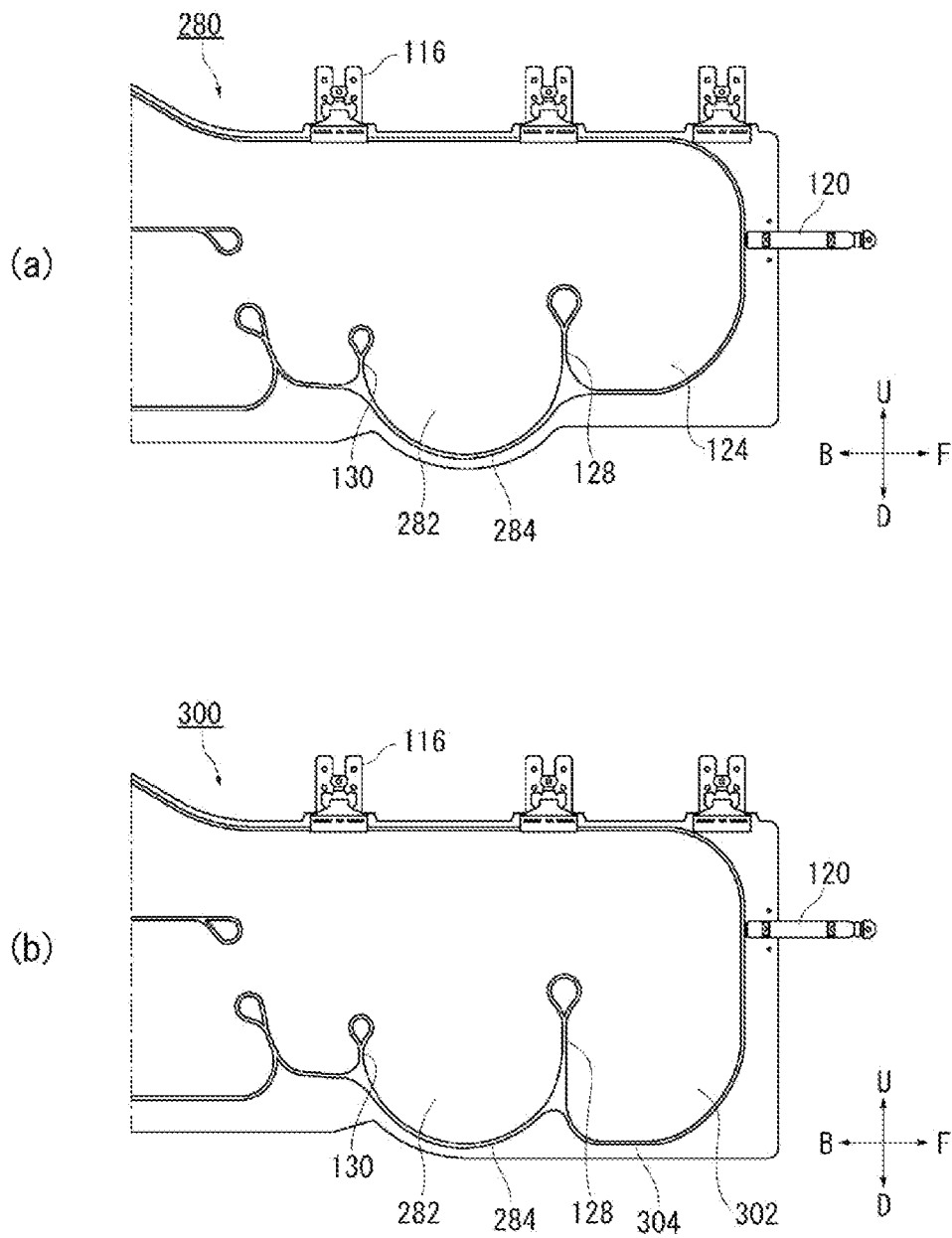
[FIG. 8]

[FIG. 9]
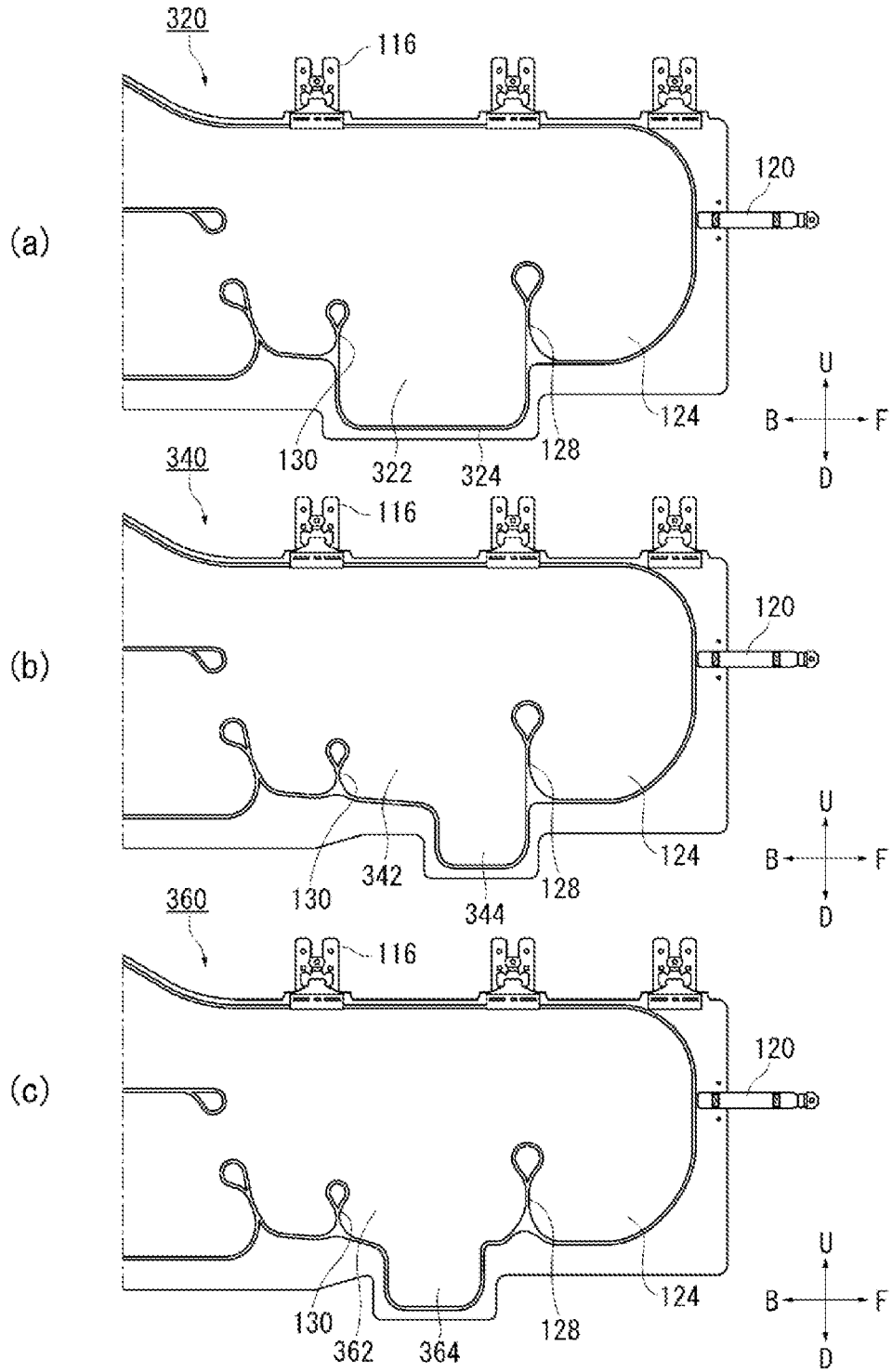

[FIG. 10]
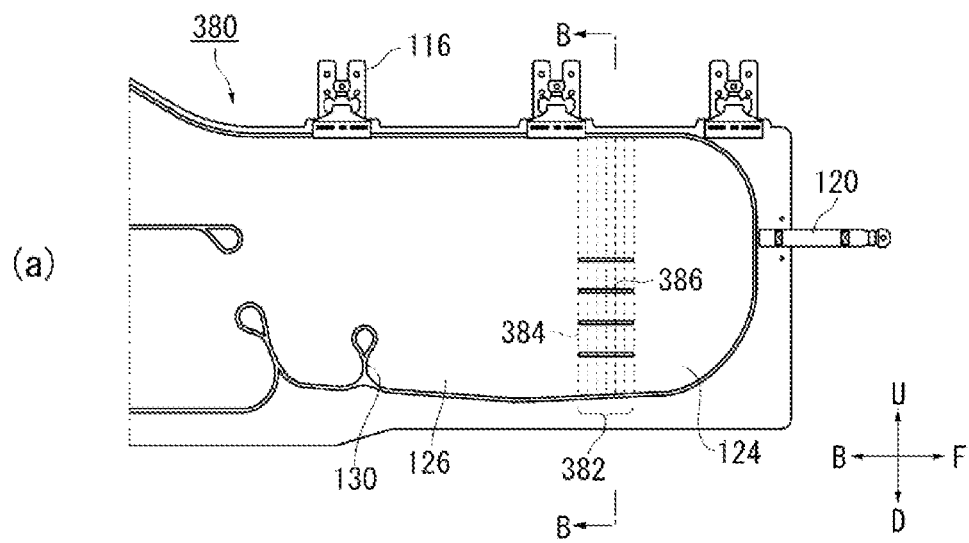
(a)
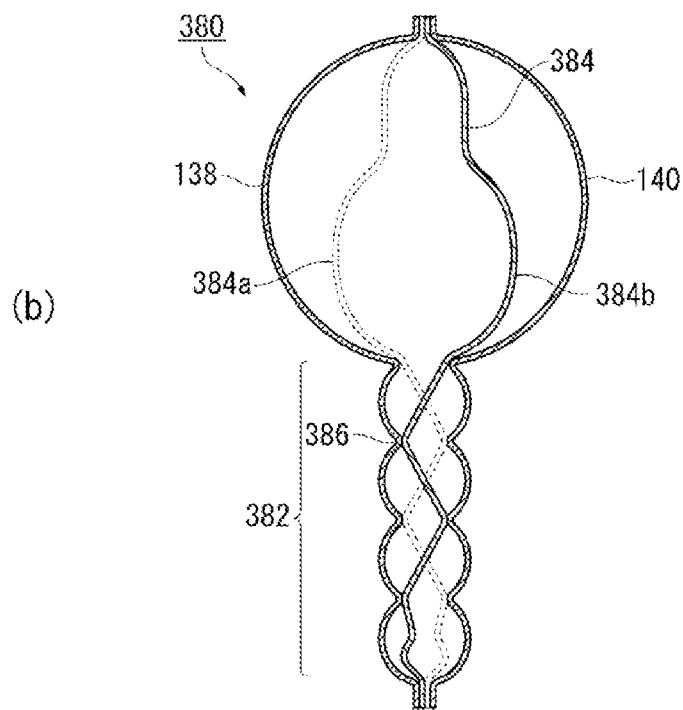
(b)
B-B

[FIG. 11]
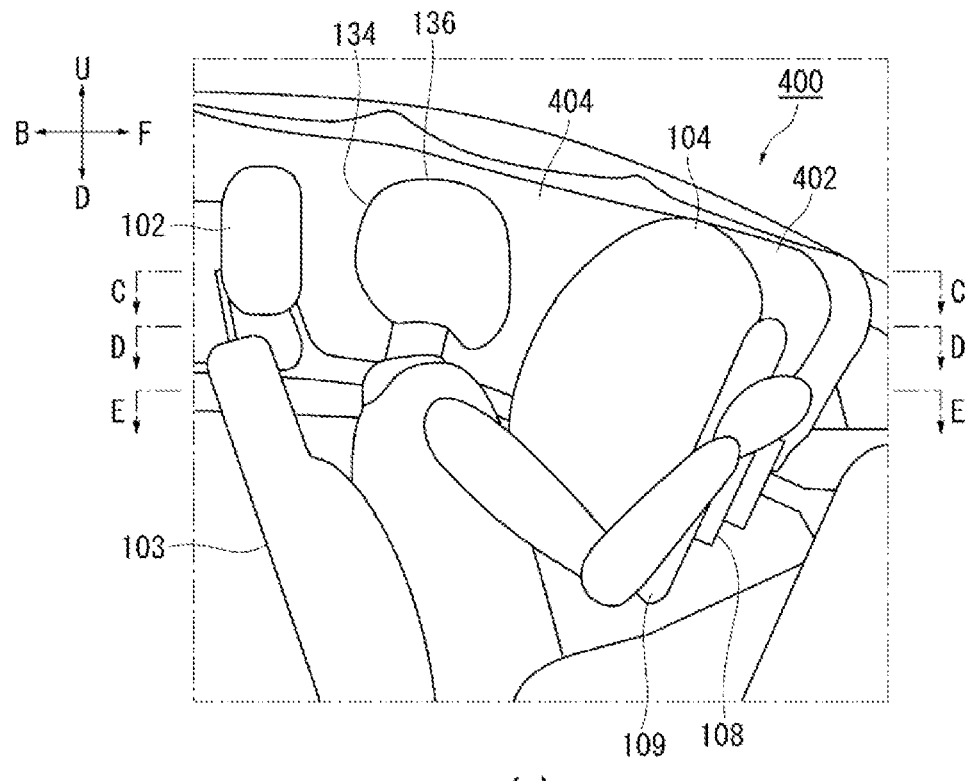
(a)
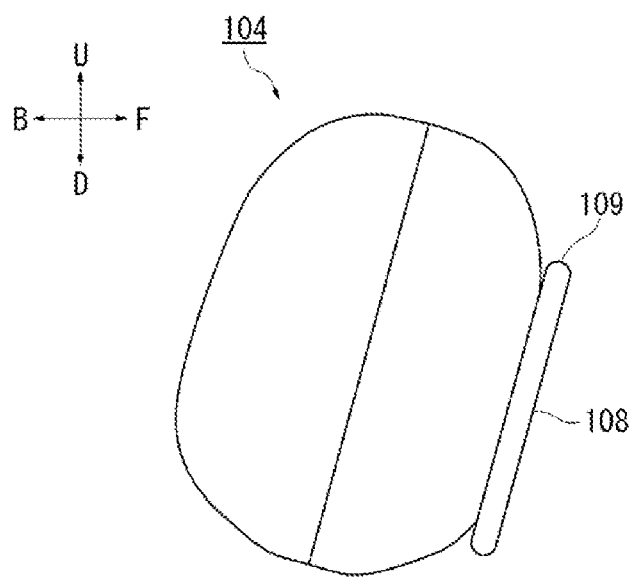
(b)

[FIG. 12]
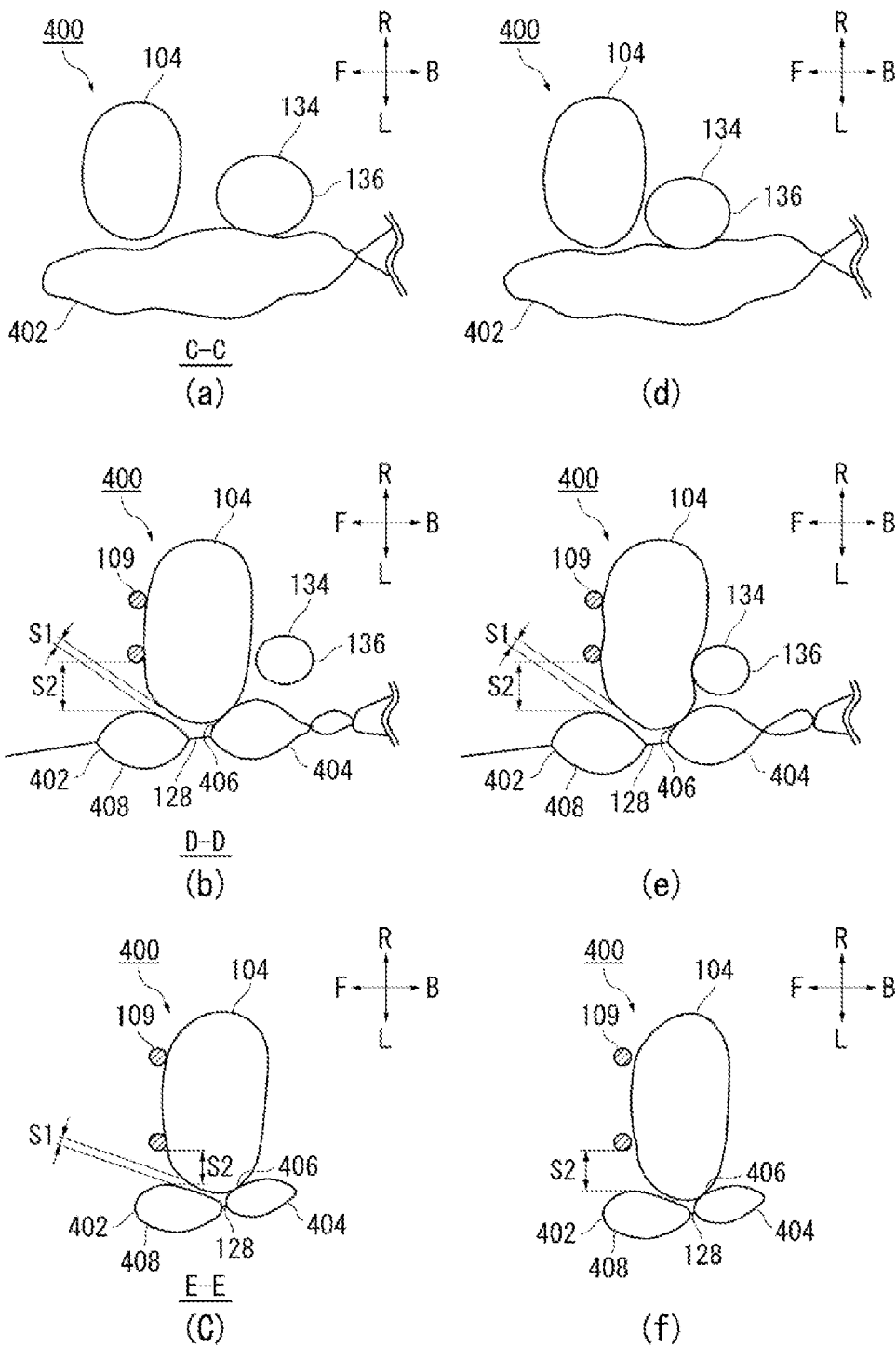

[FIG. 13]
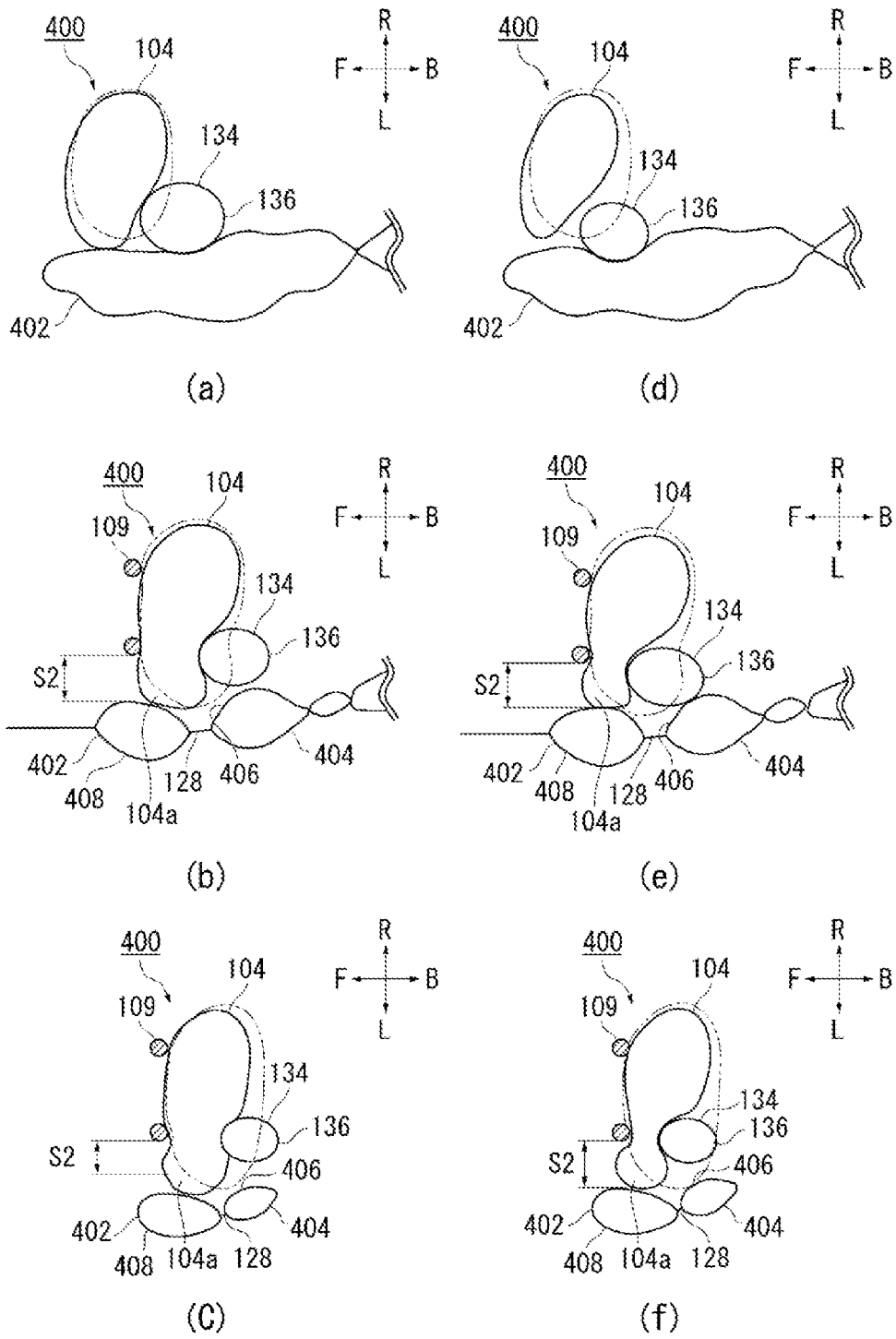

[FIG. 14]
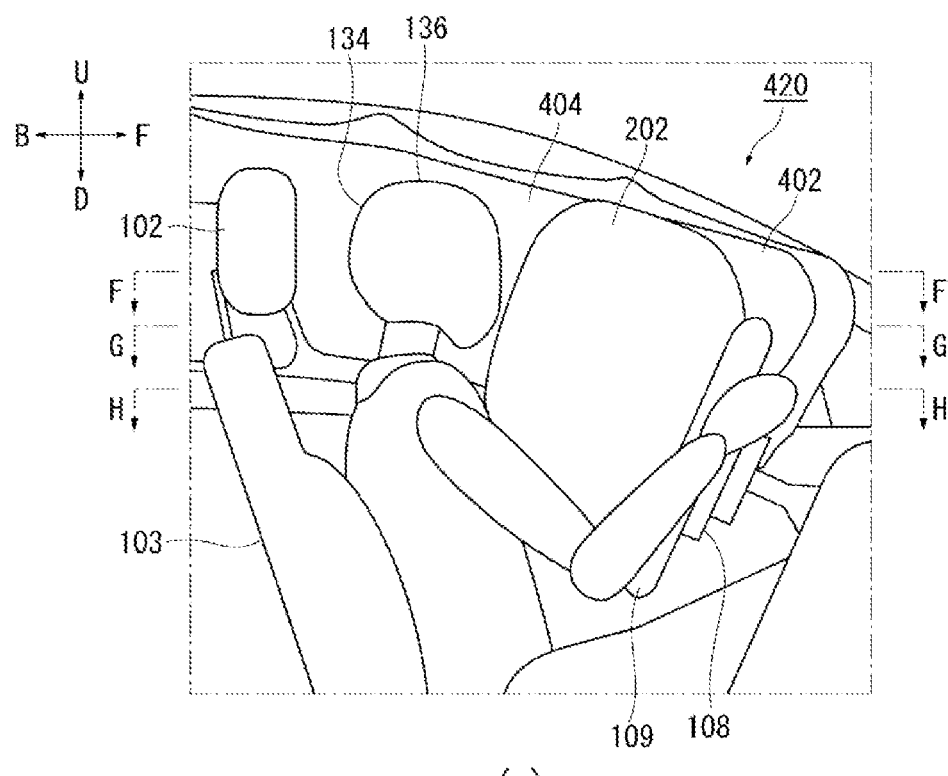
(a)
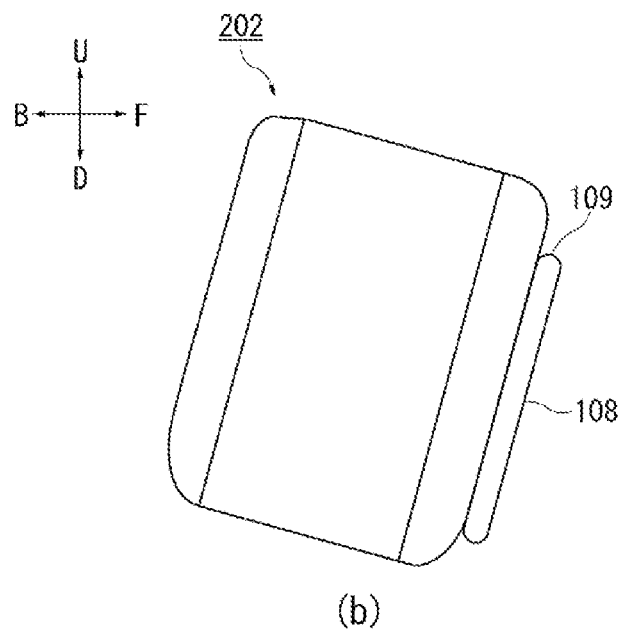
(b)

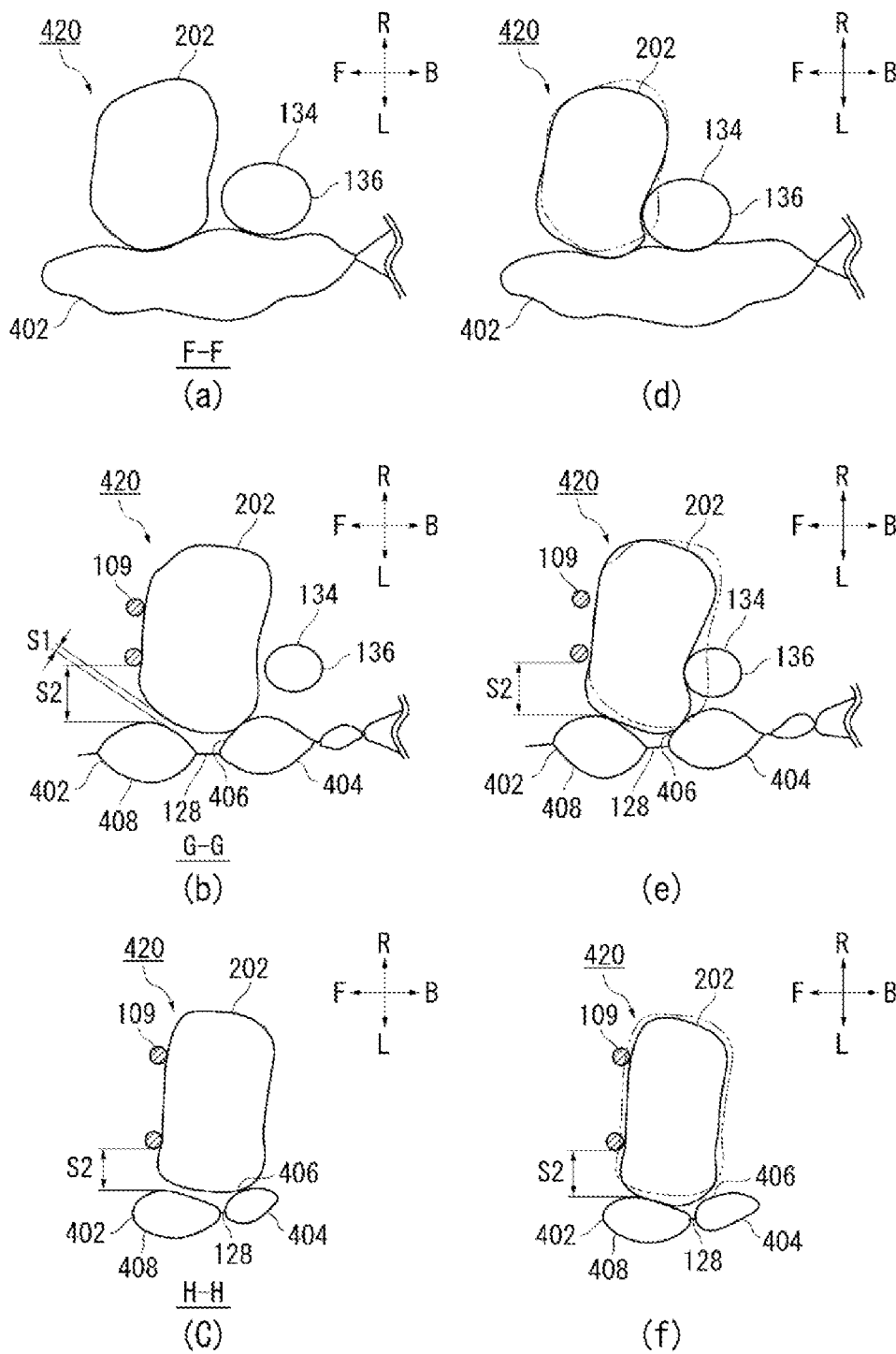

[FIG. 16]
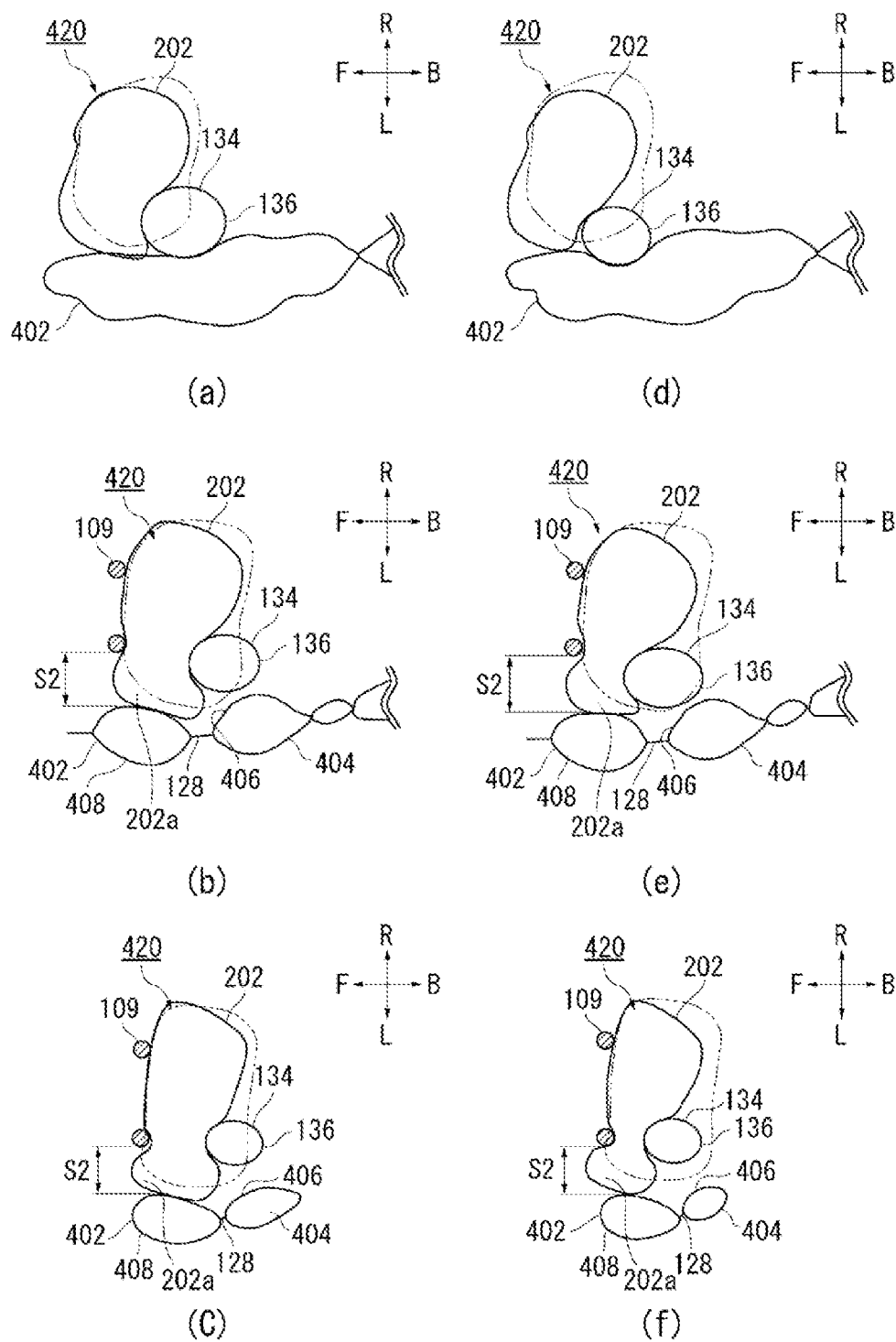

[FIG. 17]
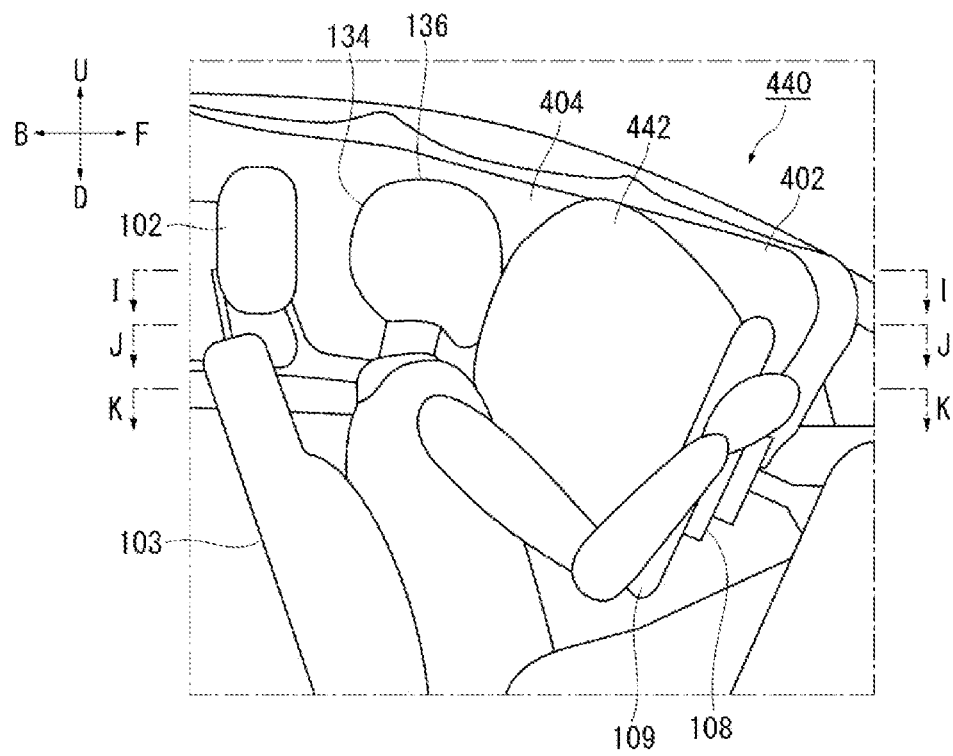
(a)
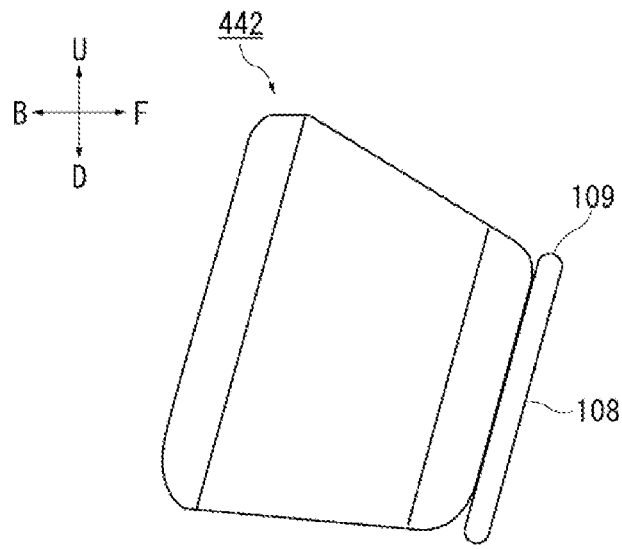
(b)

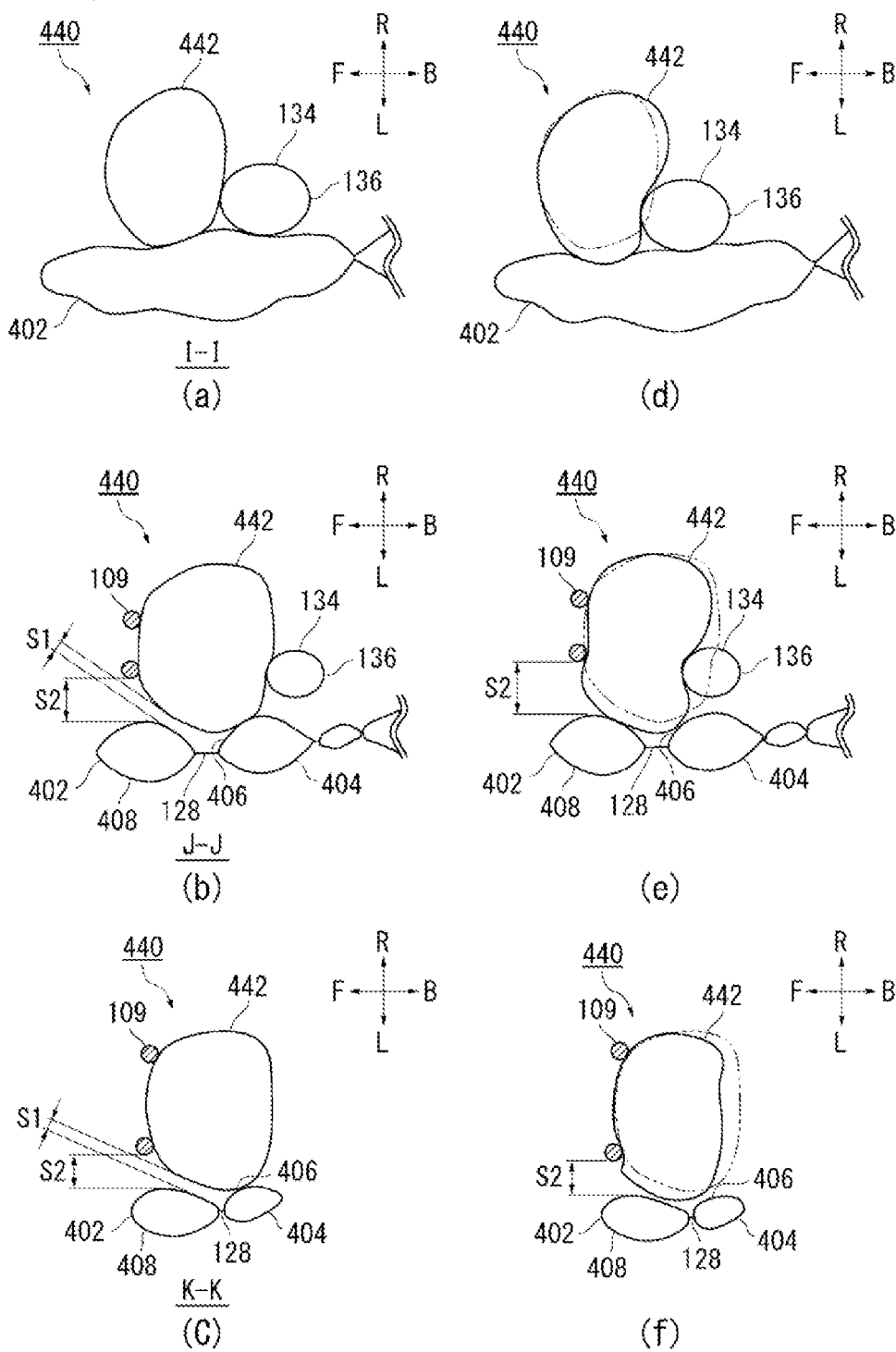
[FIG. 18]

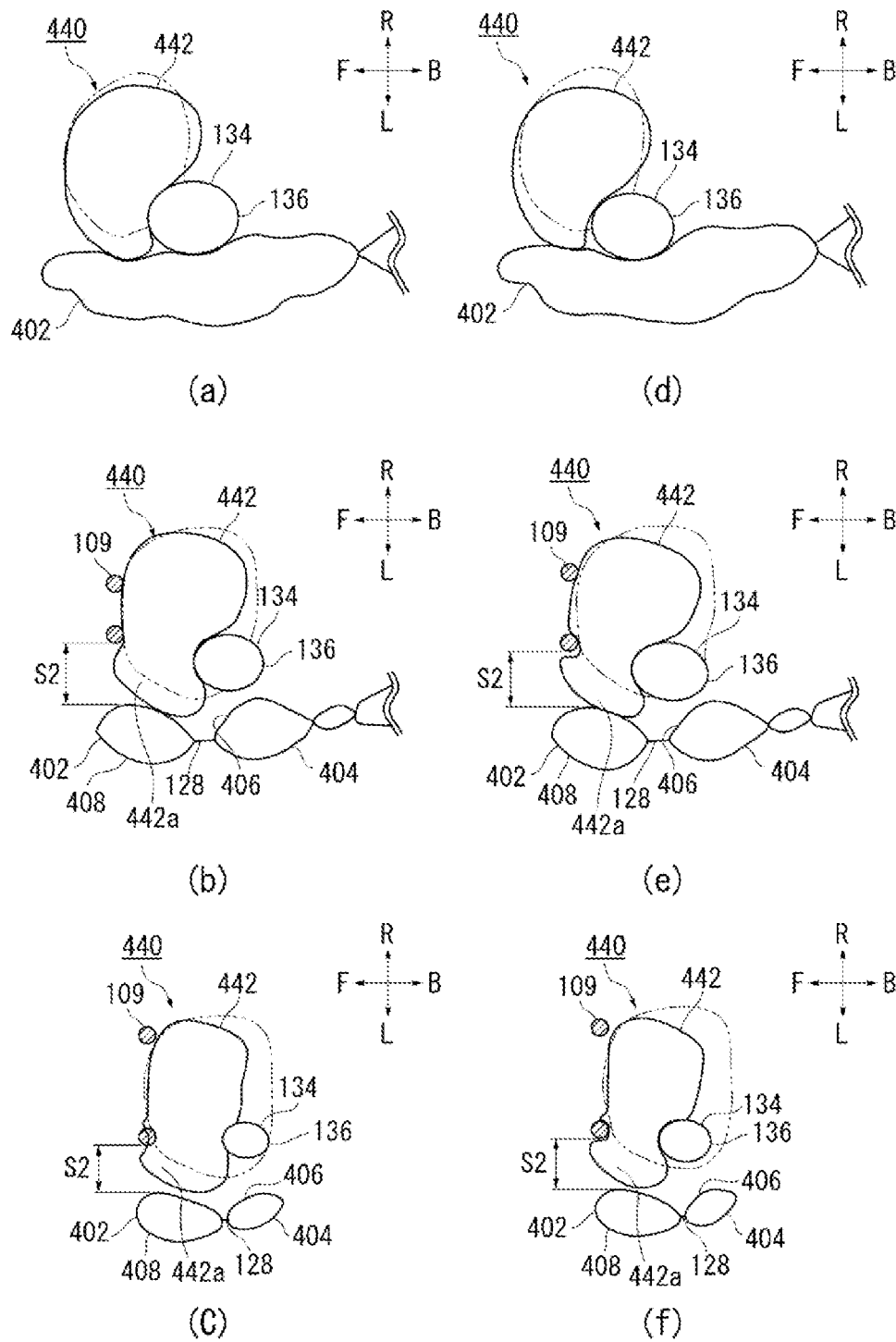
[FIG. 19]

[FIG. 20]
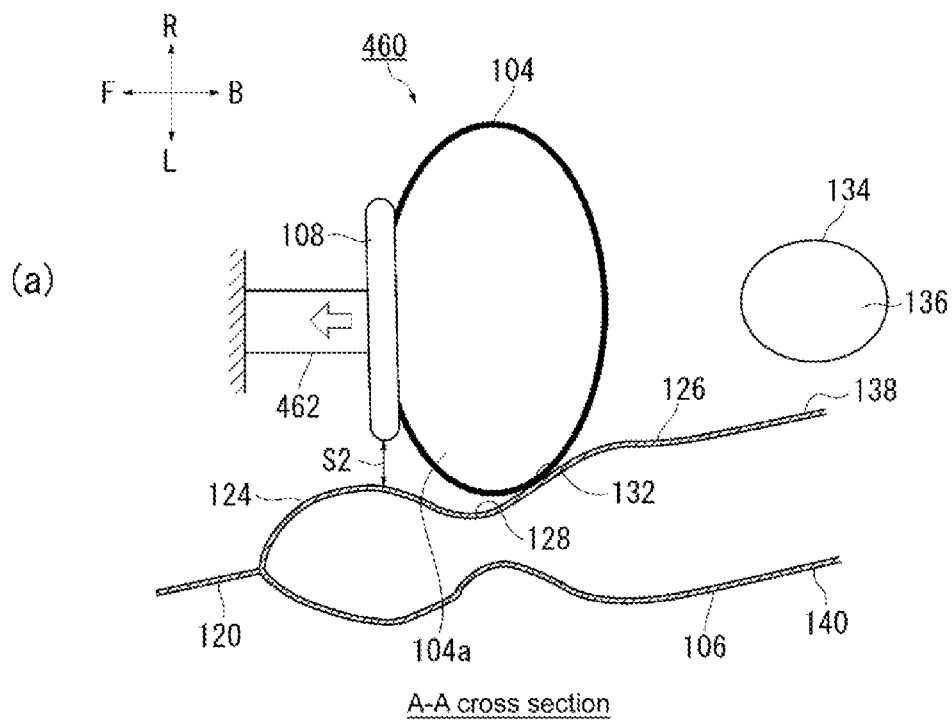
(a)
A-A cross section
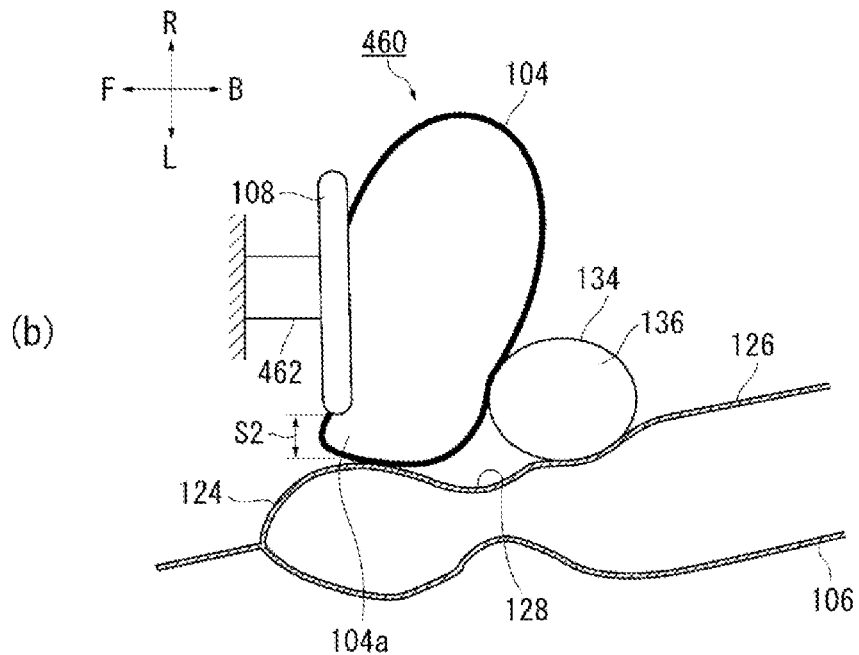
(b)

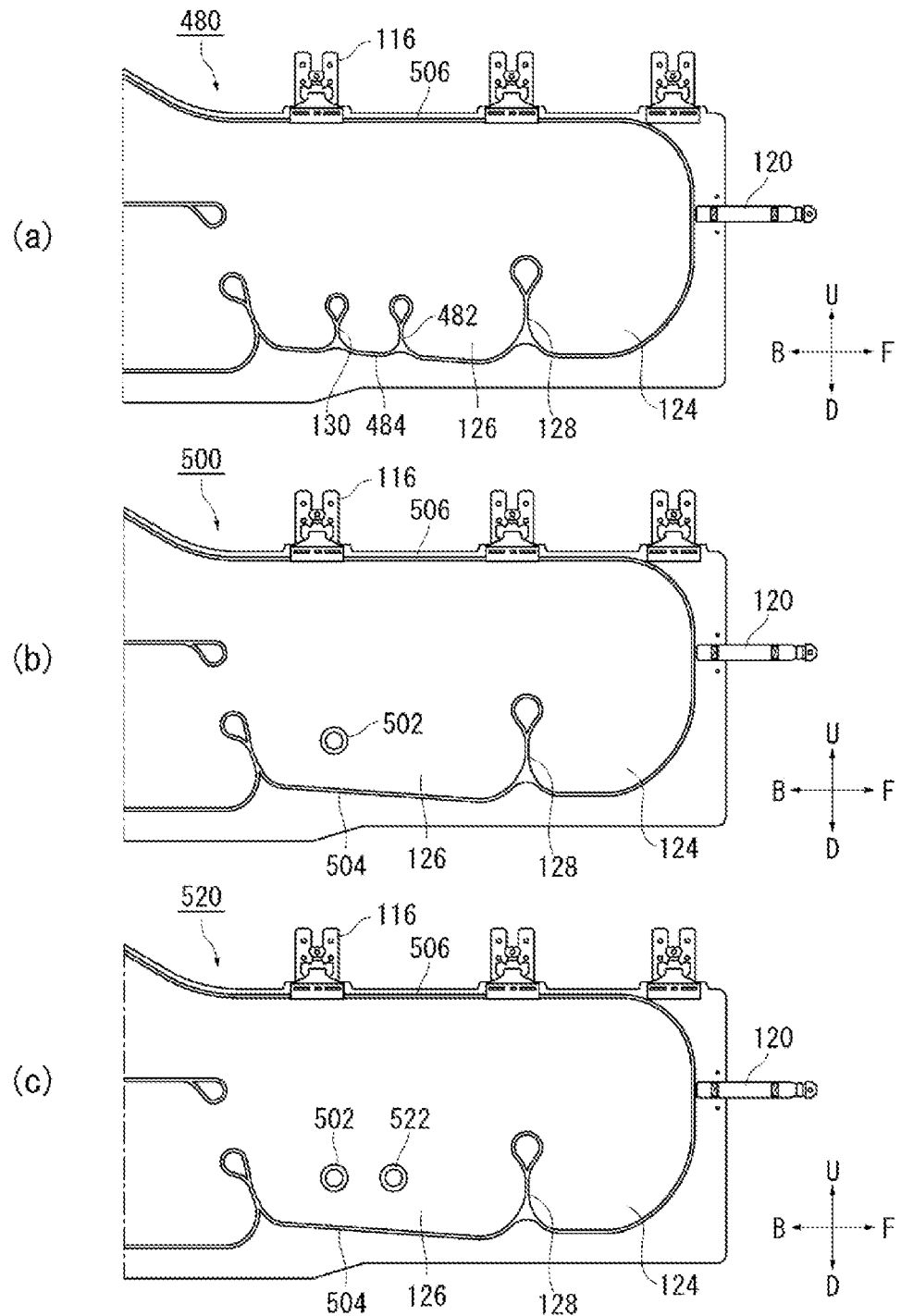

[FIG. 22]
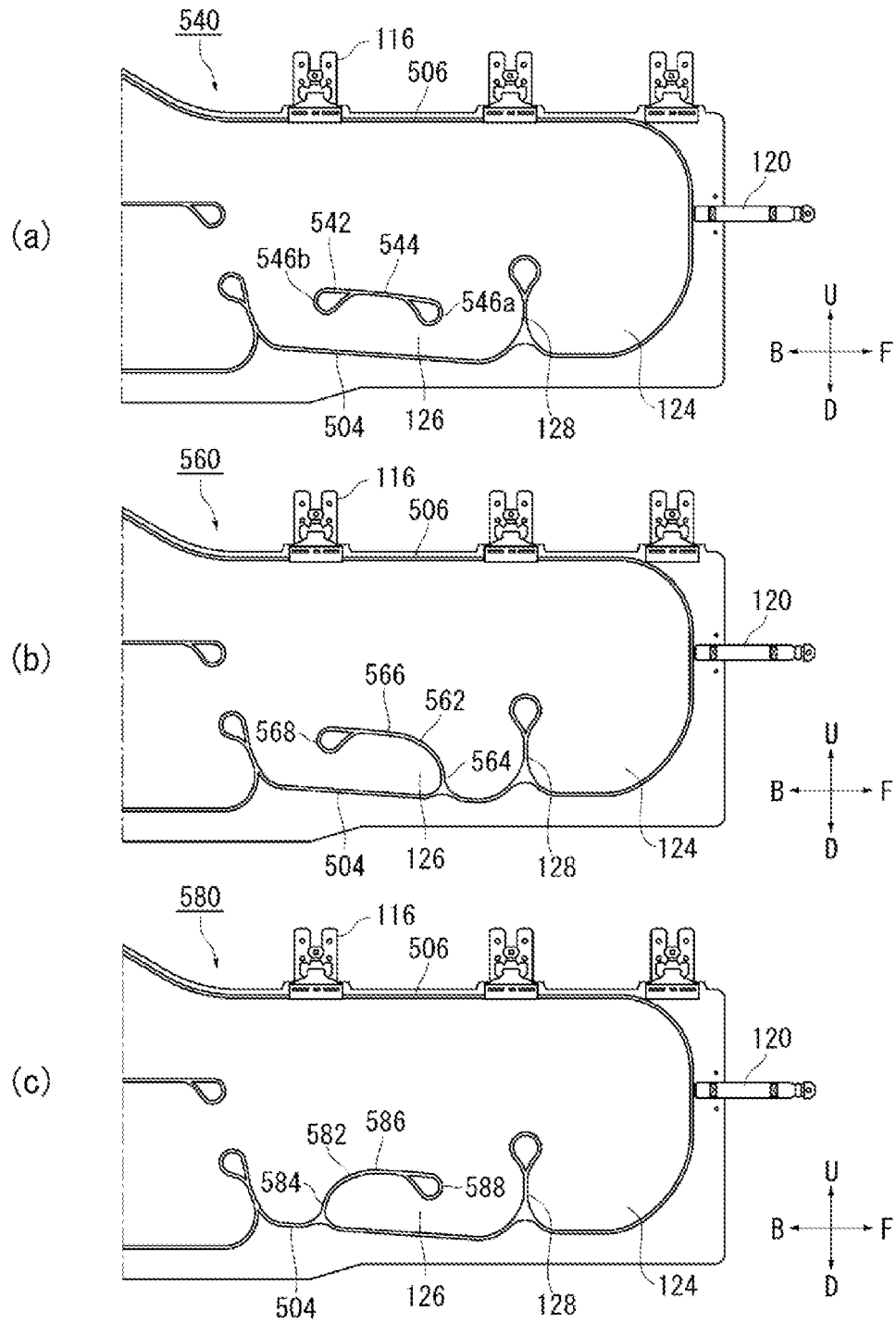

[FIG. 23]
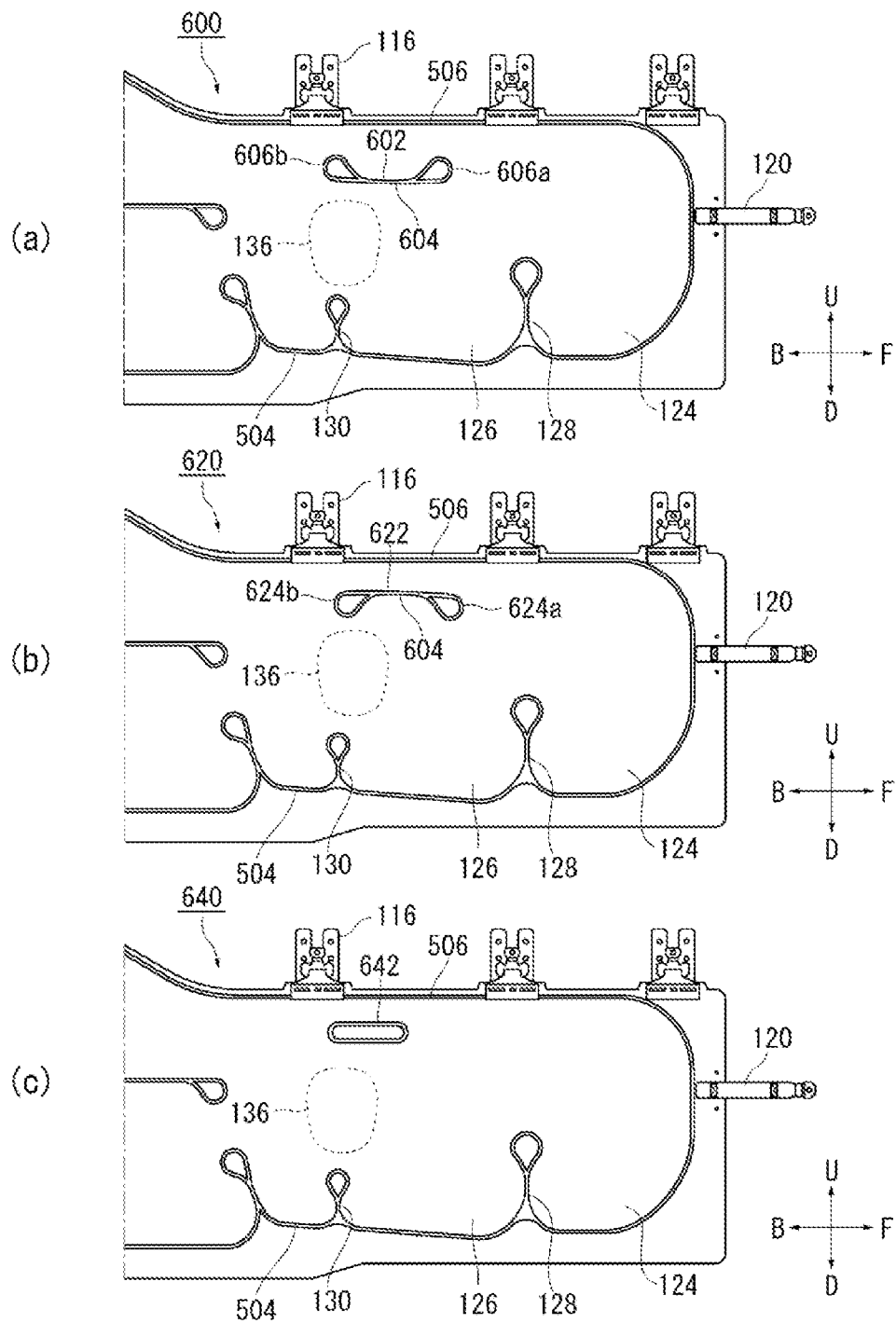

[FIG. 24]
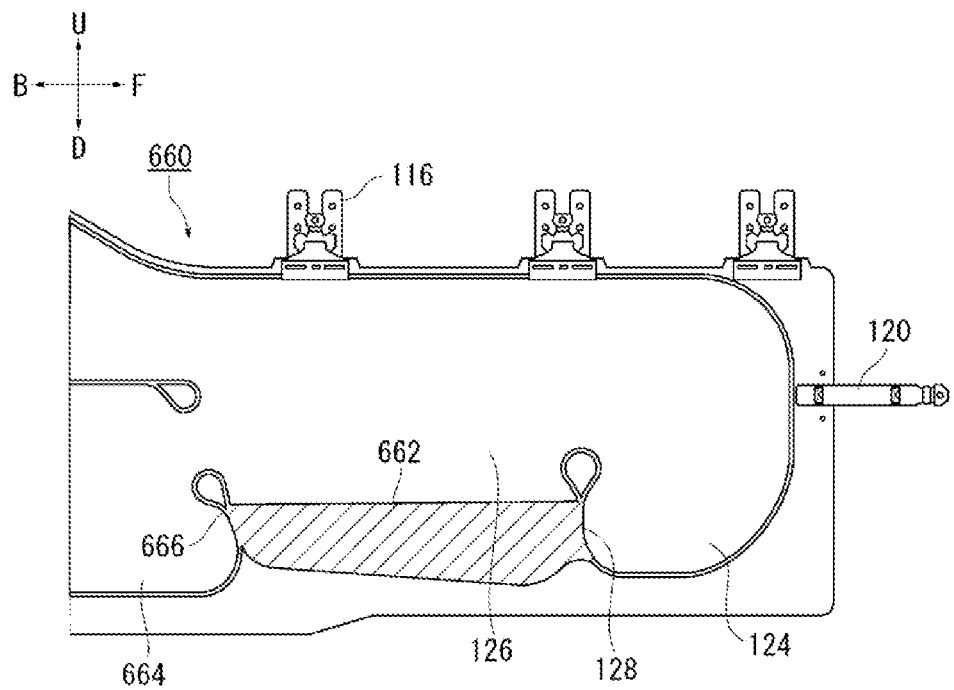
(a)
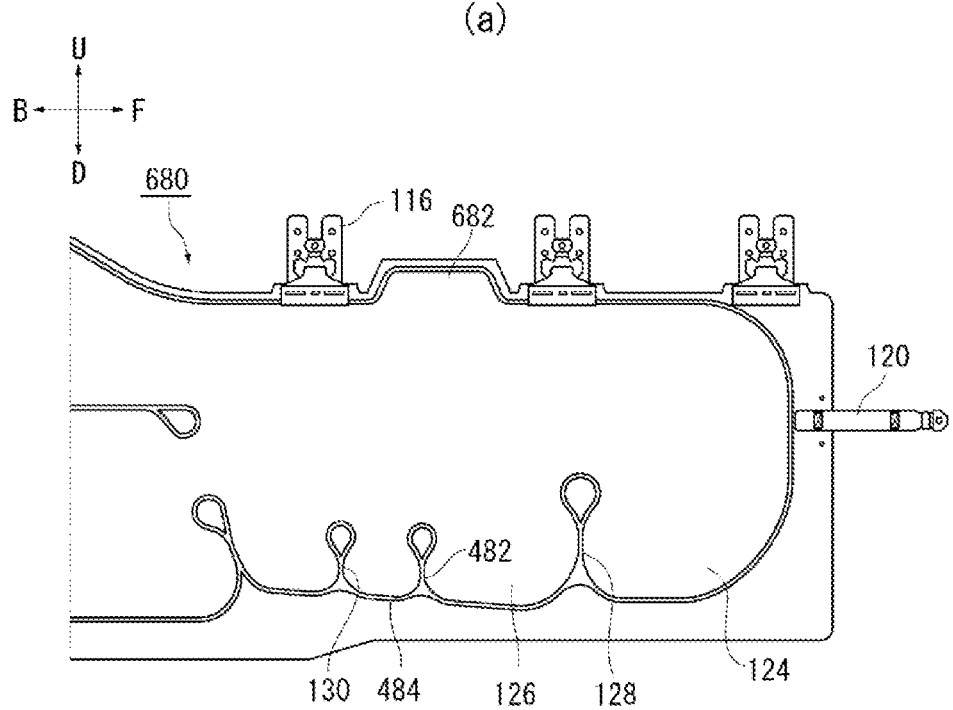
(b)

[FIG. 25]
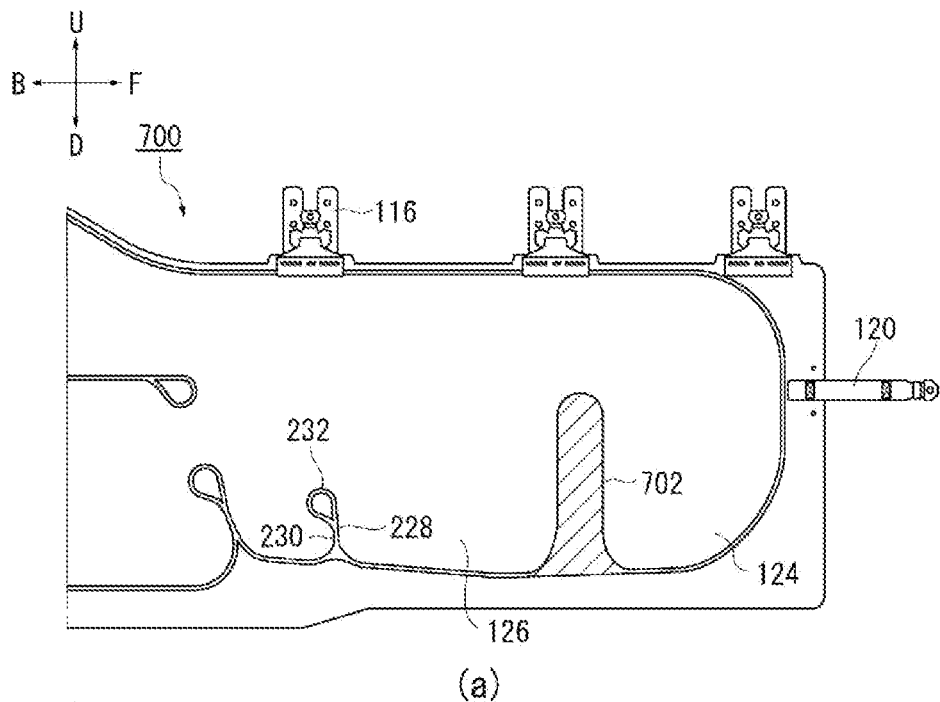
(a)
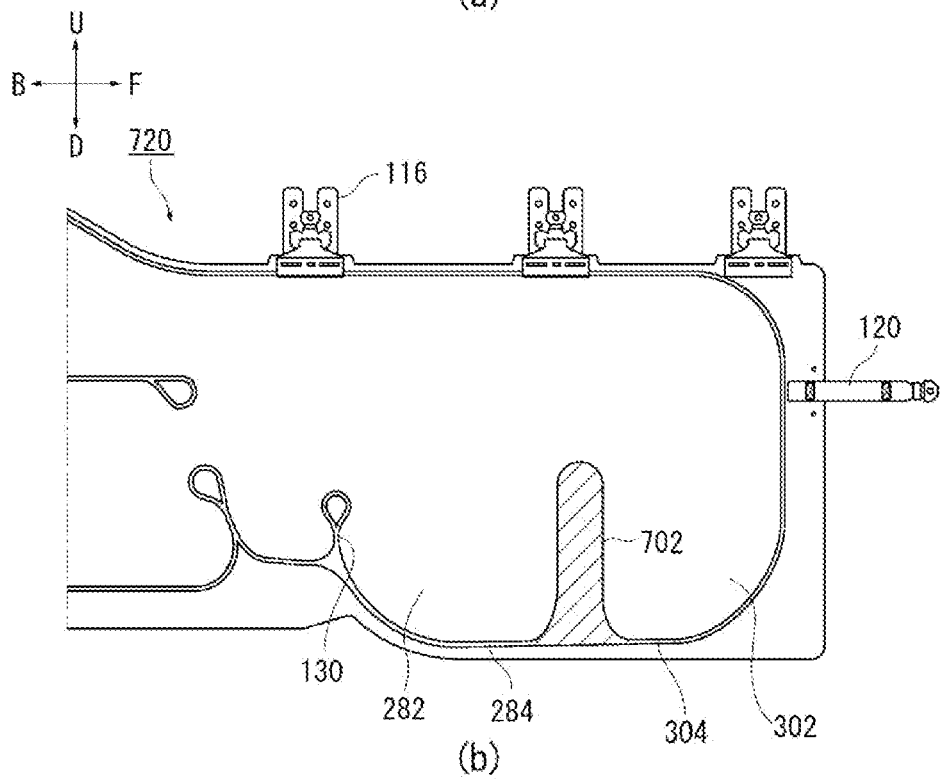
(b)

[FIG. 26]
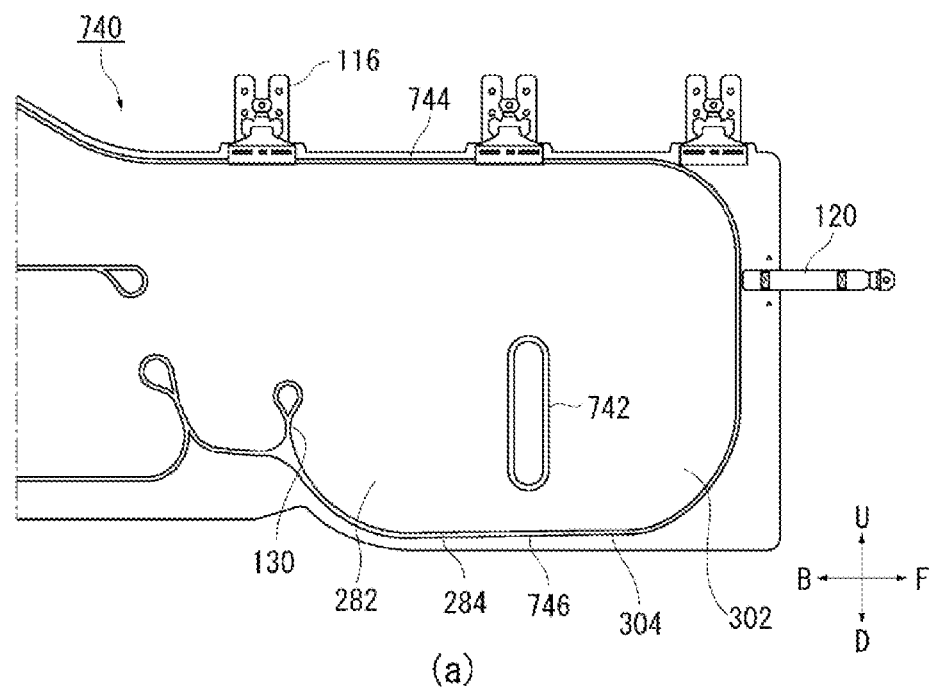
(a)
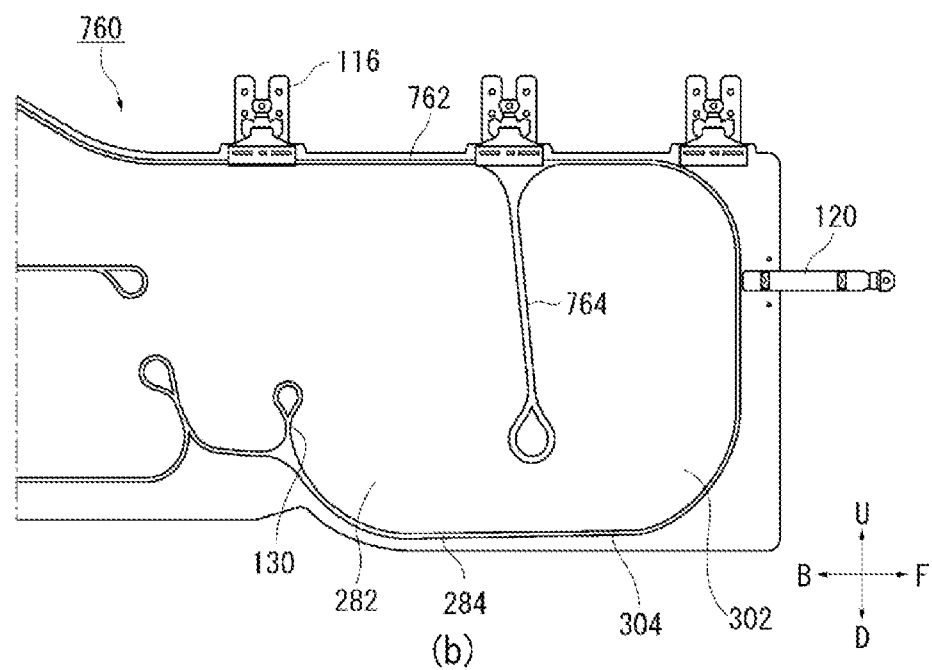
(b)

AIRBAG DEVICE

TECHNICAL FIELD

The present invention relates to an airbag device that restrains an occupant seated in the driver's seat of a vehicle.

BACKGROUND TECHNOLOGY

Airbag devices have generally become standard equipment in vehicles in recent years. An airbag device is a safety device which is operated in the event of an emergency such as a vehicle collision, retaining and protecting passengers utilizing an airbag cushion which expands and deploys based on gas pressure.

There are various types of airbag devices depending on the installation site and application. For example, a driver airbag for the driver's seat is provided in the center of the steering wheel to protect front seat occupants mainly from impacts in the front-rear direction. Furthermore, a passenger airbag is provided on an instrument panel or a peripheral area thereof in proximity to a front passenger seat. Other airbags include curtain airbags that expand and deploy along the side window provided near the ceiling in the wall in order to protect occupants in front and rear rows from a side collision or subsequent rollover, and side airbags provided in a side portion of the seat that expand and deploy into the side area of the occupant.

Currently, demands are being placed on airbag devices to support irregular collisions such as impacts from a diagonal front-rear direction relative to the vehicle, or so-called oblique collisions. During an oblique collision, the occupant enters an airbag cushion existing in front of the seat at an irregular angle, such as in an oblique direction or the like. For example, with the occupant restraint device disclosed in Patent Document 1, a driver's seat airbag 9 and a curtain airbag 10 can simultaneously restrain a front surface and a side surface of a head 20 of an occupant moving forward obliquely.

PRIOR ART DOCUMENTS

Patent Documents

Patent Document 1: Japanese Unexamined Patent Application 2016-28932

SUMMARY OF THE INVENTION

In paragraph 0033 and FIG. 3, the technology of Patent Document 1 describes that the front surface and the side surface of the head 20 of the vehicle occupant come into contact with the driver's seat airbag 9 and the curtain airbag 10 at the same time in order to restrain the head 20 without rotating the head 20. In general, rotation of the head of the occupant around the neck is likely to be a factor that increases the injury value of the occupant in view of the structure of the human body. However, the technology of Patent Document 1 leaves room for further improvement in terms of suppressing the injury value caused by the rotation of the head of the occupant.

Problem to be Solved by the Invention

In light of this type of issue, an objective of the present invention is to provide an airbag device that efficiently suppresses injury value of the occupant in the event of an emergency.

Means for Solving the Problems

In order to resolve the aforementioned problem, a typical configuration of the airbag device according to the present invention provides an airbag device for restraining an occupant seated in a driver's seat of a vehicle, the airbag device comprising: a driver airbag cushion that expands and deploys from a center portion of a steering wheel of the vehicle; and a curtain airbag cushion that expands and deploys in a vertical direction along a side window of the vehicle on an outer side in a vehicle width direction of the driver airbag cushion;

the curtain airbag cushion comprising: a first seam portion formed so as to extend vertically within a range obtained by projecting the driver airbag cushion outward in the vehicle width direction, the first seam portion connecting an outer panel on an outer side of the curtain airbag cushion in the vehicle width direction and an inner panel on an inner side of the curtain airbag cushion in the vehicle width direction; a first chamber that expands to be thicker in the vehicle width direction than the first seam portion, provided on a front side of the first seam portion; and a second chamber that expands to be thicker in the vehicle width direction than the first seam portion, provided on a rear side of the first seam portion; wherein the driver airbag cushion is expanded and deployed in a state of being separated from the first chamber while being in contact with a curved portion of the second chamber that is curved toward the first seam portion.

With the above configuration, when an occupant in the driver's seat moves obliquely forward and outward in the vehicle width direction due to an oblique collision or the like, the driver airbag cushion restrains the head from the vehicle front side, and the curtain airbag cushion restrains the head from the outer side in the vehicle width direction. At this time, with the above-described configuration, the driver airbag cushion is separated from the first chamber of the curtain airbag cushion obliquely forward on the outer side in the vehicle width direction and thus securing a gap; therefore, the driver airbag cushion can move so as to rotate outward in the vehicle width direction when the head of the occupant comes into contact with the driver airbag cushion.

The reaction force that can be applied to the head of the occupant is reduced, and the rotation of the head around the neck can be suppressed, due to the movement of the driver airbag cushion accompanied by the rotation. Therefore, with the above-described configuration, it is possible to restrain the occupant and reduce the injury value of the occupant.

The airbag device may further have a predetermined gap formed between the driver airbag cushion and the first chamber of the curtain airbag cushion; wherein the gap is formed obliquely to a front side of a vehicle outer side when viewed from an occupant who is properly seated in the driver's seat.

Since the gap is formed, as described above, the driver airbag cushion can move so as to rotate to an outer side in the vehicle width direction when the head of the occupant comes into contact with the driver airbag cushion. Therefore, restraining is possible while suppressing rotation of the head of the occupant around the neck and further reducing the injury value of the occupant.

The curtain airbag cushion expands and deploys in a state in which the first chamber is separated outward in the vehicle width direction from the steering wheel; and a vehicle width direction outer side portion of the expanded and deployed driver airbag cushion is capable of entering a space between the first chamber of the curtain airbag cushion and the steering wheel when pushed forward in the vehicle direction by the occupant.

With the above-described configuration, when the driver airbag cushion is pushed obliquely forward and outward in the vehicle width direction by the occupant, space is secured between the first chamber of the curtain airbag cushion and the steering wheel; therefore, the driver airbag cushion can rotate such that the end portion enters the space. As a result, the head of the occupant can smoothly enter between the curtain airbag cushion and the driver airbag cushion, and can be restrained while rotation of the head around the neck is suppressed and the injury value of the occupant is reduced.

When the driver airbag cushion is rotated outward in the vehicle width direction around a center portion of the steering wheel as a fulcrum, the driver airbag cushion slides while remaining in contact with the second chamber, and can come into contact with the first chamber. With this configuration, restraining is possible while reducing the reaction force that can be applied to the head of the occupant, further suppressing rotation of the head and reducing the injury value.

The curtain airbag cushion further comprises one or a plurality of second seam portions formed so as to extend vertically within a range of the second chamber and connecting the outer panel and the inner panel; and at least one of the second seam portions is formed to extend in the vertical direction with a dimension shorter than that of the first seam portion. By forming the second seam portion and adjusting the thickness of the curtain airbag cushion in the vehicle width direction, it is possible to set the airbag device such that the head of the occupant contacts the curtain airbag cushion and the driver airbag cushion at the same time.

The first seam portion can connect regions of the outer panel and the inner panel that extend in the vertical direction and have a predetermined dimension in the vehicle front-rear direction.

The gas capacity between the first chamber and the second chamber described above can be restricted by the first seam portion having the above-described configuration, and the region around the first seam portion can be widely recessed.

The first seam portion can include: a first linear portion linearly extending upward from a lower edge of the curtain airbag cushion; and a first annular portion that curves and protrudes from an upper portion of the first linear portion toward the vehicle front side; and at least one of the second seam portions can include: a second linear portion linearly extending upward from a lower edge of the curtain airbag cushion; and a second annular portion that curves and protrudes from an upper portion of the second linear portion toward the vehicle rear side.

With the above-described configuration, it is possible to restrict the gas capacity between the first chamber and the second chamber described above by providing a first annular portion in the first seam portion, and widely recessing the region around the first seam portion. In addition, it is possible to restrict the gas capacity of the second chamber by providing a second seam portion with a second annular portion, and thus adjusting the degree of expansion of the second chamber.

The first seam portion is in a state in which a plurality of tethers aligned in the vehicle front-rear direction are connected to a plurality of locations in the vertical direction of the outer panel and the inner panel while intersecting a plurality of times as viewed from the vehicle front-rear direction. With this configuration, the first seam portion can be suitably formed by restricting the inflow amount of the gas.

The first seam portion may be formed to be separated from an upper edge and a lower edge of the curtain airbag cushion. This configuration also makes it possible to suitably form the first seam portion that restricts the inflow amount of the gas.

The first seam portion may be formed continuously from an upper edge of the curtain airbag cushion. This configuration also makes it possible to suitably form the first seam portion that restricts the inflow amount of the gas.

A lower end of the second chamber of the curtain airbag cushion may overlap an inner side of a door trim of the vehicle in a vehicle width direction. The lower end side of the second chamber is supported by the door trim, so it is possible to suppress the amount discharged outside the vehicle when the occupant is restrained.

A lower end of the first chamber of the curtain airbag cushion may overlap an inner side of a door trim of the vehicle in a vehicle width direction. This configuration also makes it possible to reduce the amount discharged outside the vehicle when the curtain airbag cushion restrains an occupant.

The driver airbag cushion described above may expand and deploy in a cylindrical shape with the bottom surface in contact with the steering wheel. With a driver airbag cushion having this configuration, it is possible to suitably suppress the rotation of the head of the occupant and reduce the injury value.

The driver airbag cushion may be expanded and deployed in the shape of a truncated cone having a top surface that is in contact with the steering wheel. With a driver airbag cushion having this configuration, it is possible to suitably suppress the rotation of the head of the occupant and reduce the injury value.

The second chamber may complete expansion and deployment earlier than the driver airbag cushion. Accordingly, for example, the second chamber of the curtain airbag cushion may contact the head of the occupant from the side, and therefore it is possible to suppress rotation of the head when the occupant is restrained from the front side by the driver airbag cushion and to suitably reduce the injury value of the occupant.

The airbag device may further have a predetermined space formed
between the steering wheel and the first chamber in the vehicle width direction;
wherein the steering wheel is movable in the forward direction by a predetermined distance along a column shaft supporting the steering wheel while forming the space.

Since the space is formed as described above, the driver airbag cushion can move so as to rotate outward in the vehicle width direction when the head of the occupant comes into contact with the driver airbag cushion. Therefore, restraining is possible while suppressing rotation of the head of the occupant around the neck and further reducing the injury value of the occupant.

The second chamber may be provided between the steering wheel and a seatback of a driver's seat in the vehicle front-rear direction. The second chamber of this configuration can also provide adequate restraint for the head of the occupant.

At least one of the second seam portions is formed at a point separated from a lower edge and an upper edge of the second chamber. With the second seam portion of this configuration, it is possible to adjust the thickness of the second chamber in the vehicle width direction, and adjust the timing at which the second chamber comes into contact with the head of the occupant, and the like.

At least one of the second seam portions includes a front-rear linear portion formed in a state of extending in the vehicle front-rear direction. With the second seam portion of this configuration, it is possible to adjust the thickness of the second chamber in the vehicle width direction, and adjust the timing at which the second chamber comes into contact with the head of the occupant, and the like.

At least one of the second seam portions is formed as a non-expandable region having a predetermined area provided within a range of the second chamber. With the second seam portion of this configuration, it is possible to adjust the thickness of the second chamber in the vehicle width direction, and adjust the timing at which the second chamber comes into contact with the head of the occupant, and the like.

Effect of the Invention

The present invention can provide an airbag device capable of efficiently suppressing an injury value of an occupant in the event of an emergency.

BRIEF DESCRIPTION OF THE DRAWINGS

FIG. 1 is a diagram that illustrates an overview of the airbag device according to the embodiment of the present invention.

FIG. 2 is a diagram illustrating the curtain airbag cushion of FIG. 1(b) as seen from a vehicle inner side.

FIG. 3 is an overall cross-sectional view along line A-A of the airbag device in FIG. 1(b).

FIG. 4 is a diagram illustrating a process whereby the airbag device in FIG. 3 restrains an occupant 134 during an oblique collision.

FIG. 5 is a diagram illustrating the space formed by the airbag device in FIG. 3.

FIG. 6 is a diagram illustrating a modified example of the airbag device in FIG. 4(a).

FIG. 7 is a diagram illustrating the first to third modified examples of the curtain airbag cushion in FIG. 2(b).

FIG. 8 is a diagram illustrating the fourth and fifth modified examples of the curtain airbag cushion in FIG. 2(b).

FIG. 9 is a diagram illustrating the sixth to eighth modified examples of the curtain airbag cushion in FIG. 2(b).

FIG. 10 is a diagram illustrating the ninth modified example of the curtain airbag cushion in FIG. 2(b).

FIG. 11 is a diagram illustrating a modified example of the airbag device in FIG. 1(b).

FIG. 12 is a diagram illustrating the process of restraining an occupant using cross-sectional views of the airbag device in FIG. 11(a).

FIG. 13 is a diagram illustrating the process of restraining an occupant using cross-sectional views of the airbag device in FIG. 11(a).

FIG. 14 is a diagram illustrating a modified example of the airbag device in FIG. 6.

FIG. 15 is a diagram illustrating the process of restraining an occupant using cross-sectional views of the airbag device in FIG. 14(a).

FIG. 16 is a diagram illustrating the process of restraining an occupant using cross-sectional views of the airbag device in FIG. 14(a).

FIG. 17 is a diagram illustrating a modified example of the airbag device in FIG. 6.

FIG. 18 is a diagram illustrating the process of restraining an occupant using cross-sectional views of the airbag device in FIG. 17(a).

FIG. 19 is a diagram illustrating the process of restraining an occupant using cross-sectional views of the airbag device in FIG. 17(a).

FIG. 20 is a diagram illustrating a modified example of the airbag device in FIG. 5.

FIG. 21 is a diagram illustrating the modified examples of the curtain airbag cushion in FIG. 2(b).

FIG. 22 is a diagram illustrating the modified examples of the curtain airbag cushion in FIG. 2(b).

FIG. 23 is a diagram illustrating modified examples of the curtain airbag cushion in FIG. 2(b).

FIG. 24 is a diagram illustrating modified examples of the curtain airbag cushion in FIG. 2(b).

FIG. 25 is a diagram illustrating the modified examples of the curtain airbag cushion in FIG. 2(b).

FIG. 26 is a diagram illustrating the modified examples of the curtain airbag cushion in FIG. 2(b).

MODE FOR CARRYING OUT THE INVENTION

Preferred Embodiments according to the present invention will hereinafter be described in detail with reference to the attached drawings. Dimensions, materials, other specific numerical values, and the like indicated in the Embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

FIG. 1 illustrates an overview of the airbag device (hereinafter, airbag device 100) according to an embodiment of the present invention. FIG. 1(a) is a view illustrating a vehicle prior to the activation of the airbag device 100. Hereinafter, regarding FIG. 1(a) and other diagrams, a vehicle front-to-back direction is illustrated by the symbols F (Front) and B (Back), a vehicle width direction of the vehicle by the symbols L (Left) and R (Right), and a vehicle up-down direction by the symbols U (Up) and D (Down).

In this embodiment, the airbag device 100 is implemented for restraining an occupant 134 (see FIG. 4(a)) seated in the driver's seat 102 (front row left side seat) in a left-hand drive vehicle. Hereinafter, descriptions are made assuming the front row left side driver's seat 102, and for example, the outer side in the vehicle width direction (vehicle outer side) refers to the left side of the vehicle, and the inner side of the vehicle (vehicle inner side) refers to the right side of the vehicle. Furthermore, "upward" refers to a direction towards the head 136 as viewed from an occupant 134 properly seated on the driver's seat 102, and "downward" refers to a direction towards the lower limbs as viewed from the occupant 134.

The airbag device 100 has a driver airbag cushion 104 (see FIG. 1(b)) and a curtain airbag cushion 106 as the parts that restrain the occupant 134 (see FIG. 4(a)). The driver airbag cushion 104 is provided at a center portion 110 of the steering wheel 108 and restrains the occupant 134 in the driver's seat 102 from the front. The driver airbag cushion 104 is folded, rolled, or the like, stored in a housing or the like inside the center portion 110 of the steering wheel 108.

FIG. 1(b) is a diagram illustrating a condition after activation of the airbag device 100 of FIG. 1(a). The driver airbag cushion 104 and curtain airbag cushion 106 are formed into a bag shape by sewing or adhering two base fabrics that make up the surface of the bag, or by spinning using one-piece woven (OPW) technology.

When a vehicle is involved in a collision or the like, various sensors (not illustrated) provided in the vehicle detect the impact, and thereby a signal is transmitted to an inflator provided in each airbag cushion. Upon receiving this signal, gas is supplied from the inflator, and the driver airbag cushion 104 ruptures the cover at the center portion 110 of the steering wheel 108, and is expanded and deployed. At this time, the driver airbag cushion 104 is expanded and deployed in a circular three dimensional shape in the vehicle front side of the driver's seat 102.

When an offset collision or a side collision is detected by various sensors, the curtain airbag cushion 106 on the vehicle outer side of the driver airbag cushion 104 expands and deploys in the vertical direction along the side window 112 from the vicinity of the roof side rail 114 above the side window 112 (see FIG. 2(a)).

FIG. 2 is a diagram illustrating the curtain airbag cushion 106 of FIG. 1(b) as seen from the inside of the vehicle. FIG. 2(a) illustrates an overall overview of the curtain airbag cushion 106.

The curtain airbag cushion 106 is widely expanded and deployed in the vehicle front-rear direction on the vehicle outer side of the front row driver's seat 102 and the rear row seat. The expansion areas in various regions of the curtain airbag cushion 106 are compartmentalized into small rooms, called chambers, depending on the gas flow, the occupant, and the structure of the seat, and the like.

The curtain airbag cushion 106 is secured to the roof side rail 114 of the vehicle via a plurality of tabs 116 provided on the upper edge, and a cylindrical inflator 118 is also provided on the upper edge. The front end of the curtain airbag cushion 106 is connected to the A-pillar 122 of the vehicle by a strap 120. Note that the curtain airbag cushion 106 before activation is rolled, folded, or the like from below the vehicle, is in a storage form that is elongated in the vehicle front-rear direction, and is covered and hidden by a head lining (not illustrated) that is an interior material, and therefore cannot be seen by the occupant.

FIG. 2(b) is an enlarged example of the front side of the curtain airbag cushion 106 in FIG. 2(a). The curtain airbag cushion 106 restrains an occupant 134 (see FIG. 4 a) in the driver's seat 102 using the chambers provided on the front side.

The first chamber 124 is a chamber provided on the front side of the chambers, and the airbag expands and deploys obliquely forward on the vehicle outer side as viewed from the occupant 134 (see FIG. 4(a)) in the driver's seat 102 (see FIG. 1(b) and the like). The second chamber 126 is expanded and deployed behind the first chamber 124 in a range on the vehicle outer side when viewed from the occupant 134 in the driver's seat 102. It is to be noted that the numbers such as "first" and the like are assigned in order from the front for convenience only.

The second chamber 126 is provided between the steering wheel 108 (see FIG. 1(a)) and the seatback of the driver's seat 102 in the vehicle front-rear direction. It is possible to suitably restrain the head 136 of the occupant 134 (see FIG. 4(a)) from the side by the second chamber 126 having this configuration.

The first seam portion 128 separates the first chamber 124 from the second chamber 126. The first seam portion 128 of the present embodiment is formed so as to extend upward from the lower edge of the curtain airbag cushion 106, and joins or connects the outer panel 140 (see FIG. 3) on the vehicle outer side of the curtain airbag cushion 106 and the inner panel 138 on the vehicle inner side.

The second seam portion 130 is formed by, for example, connecting the outer panel 140 (see FIG. 3) and the inner panel 138 behind the first seam portion 128, or the like. The second seam portion 130 is formed so as to extend upward from the lower edge in the vertical direction with a dimension shorter than that of the first seam portion 128, and is provided mainly for adjusting the capacity of the second chamber 126.

FIG. 3 is a schematic cross-sectional view along line A-A of the airbag device 100 in FIG. 1(b). In FIG. 3, the left side of the drawing illustrates the front of the vehicle.

The first seam portion 128 of the curtain airbag cushion 106 is formed by joining, connecting, or the like the inner panel 138 and the outer panel 140 on the vehicle inner side of the curtain airbag cushion 106 within the range E1 where the driver airbag cushion 104 is projected on the vehicle outer side.

The first chamber 124 expands to be thicker in the vehicle width direction than the first seam portion 128, and is provided on a front side of the first seam portion 128. Furthermore, the second chamber 126 expands to be thicker in the vehicle width direction than the first seam portion 128, and is provided on a rear side of the first seam portion 128. Therefore, in the curtain airbag cushion 106, a recessed portion R1 recessed toward the vehicle outer side is formed by the first seam portion 128 on the vehicle outer side of the driver airbag cushion 104. Note that as an example, it is preferable that the thickness in the vehicle width direction of the second chamber 126 be about 180 mm±20 mm.

The driver airbag cushion 104 is expanded and deployed in a state separated from the first chamber 124 while being in contact with a curved portion 132 of the second chamber 126 that is curved toward the first seam portion 128. In other words, a major feature of the airbag device 100 of the present embodiment is that a gap S1 is formed between the expanded and deployed driver airbag cushion 104 and the curtain airbag cushion 106 obliquely forward on the vehicle outer side, as seen from the driver airbag cushion 104. Note that as an example, the gap S1 can be set to be about 10 mm to 50 mm, as viewed from above.

FIG. 4 is a diagram illustrating a process whereby the airbag device (airbag device 100) in FIG. 3 restrains an occupant 134 during an oblique collision. FIG. 4(a) shows the initial state of the expanded and deployed airbag cushions.

When viewed from the occupant 134 in the driver's seat 102 (see FIG. 1(b)), which is the left-side seat in the front row, the left side (vehicle outer side) in the vehicle width direction is the side closest to the collision, that is, the so-called near side. On the other hand, the right side (vehicle inner side) in the vehicle width direction when viewed from the occupant 134 in the driver's seat 102 is the side farther from the collision, that is, the so-called far side. When a near side collision of the vehicle is detected via various sensors and a predetermined electronic control unit (ECU), both the driver airbag cushion 104 and also the curtain airbag cushion 106 expand and deploy.

In this embodiment, a gap S1 is formed between the driver airbag cushion 104 and the first chamber 124 of the curtain airbag cushion 106 obliquely forward to the vehicle outer side as viewed from the occupant 134 properly seated in the driver's seat 102.

FIG. 4(*b*) illustrates a condition in which the occupant 134 has further moved obliquely forward to the vehicle outer side, as compared to FIG. 4(*a*). When an oblique collision occurs on the left side of the vehicle, the occupant 134 moves obliquely forward toward the vehicle outer side due to inertia, and enters a point further toward the vehicle outer side than the center of the driver airbag cushion 104. At this time, in the present embodiment, the driver airbag cushion 104 contacts the front portion of the head 136 of the occupant 134 and the second chamber 126 of the curtain airbag cushion 106 contacts the side portion of the head 136 of the occupant 134 at substantially the same time.

Herein, as described with reference to FIG. 2(*b*), the second chamber 126 is provided with the second seam portion 130 (see FIG. 2(*b*)). The second chamber 126 can be set so that the head 136 of the occupant 134 comes into contact with the driver airbag cushion 104 at the same time by forming the second seam portion 130 and adjusting the thickness in the vehicle width direction.

FIG. 4(*c*) illustrates a condition in which the occupant 134 has moved even further obliquely forward to the vehicle outer side, as compared to FIG. 4(*b*). As described with reference to FIG. 3, in the present embodiment, a gap S1 (see FIG. 3) is formed between the driver airbag cushion 104 and the first chamber 124 of the curtain airbag cushion 106 in the oblique forward direction to the vehicle outer side, as viewed from the driver airbag cushion 104. Therefore, the driver airbag cushion 104 can move so as to rotate forward on the vehicle outer side when the head 136 of the occupant 134 comes into contact with the driver airbag cushion 104.

When the driver airbag cushion 104 is rotated outward in the vehicle width direction around a center portion 110 of the steering wheel 108 as a fulcrum, the driver airbag cushion slides while remaining in contact with the second chamber 126, and can come into contact with the first chamber 124. The reaction force that can be applied to the head 136 of the occupant 134 is reduced, and the rotation of the head 136 around the neck can be suppressed, due to the movement of the driver airbag cushion 104 in conjunction with the rotation.

For example, in a case where the driver airbag cushion 104 is supported by the curtain airbag cushion 106 from the front and is not movable, when the head 136 moves obliquely forward toward the vehicle outer side and comes into contact with the driver airbag cushion, a clockwise rotational force may be generated in the head 136 around the neck, as viewed from above. When such rotation occurs in the head 136, the injury value tends to increase. Therefore, in the present embodiment, the gap S1 (see FIG. 4(*a*) and the like) is secured so that the driver airbag cushion 104 is rotatable and the reaction force applied to the head 136 is suppressed.

The airbag device 100 can align the movements of the head 136 and the shoulders and the like of the occupant 134 by the above-described function, and restrains by greatly reducing or eliminating the rotation of the head 136 turning to the left or right with respect to the shoulders, as well as the rotation of the head 136 up or down or to the left or right. As described above, the airbag device 100 restrains the head 136 from a plurality of directions using both the driver airbag cushion 104 and the curtain airbag cushion 106, and reduces the angular velocity of the head 136 in order to efficiently suppress the injury value of the occupant 134.

The function of the airbag device 100 will be further described. FIG. 5 is a diagram illustrating the space formed by the airbag device (airbag device 100) in FIG. 3. FIG. 5(*a*) is a diagram illustrating the initial condition of the expanding and deploying of the airbag cushion in FIG. 4(*a*). In the airbag device 100, the driver airbag cushion 104 is able to rotate more smoothly due to the space S2.

With the airbag device 100, the curtain airbag cushion 106 is expanded and deployed in a state where the first chamber 124 is separated from the steering wheel 108 to the outer side in the vehicle width direction. Therefore, a space S2 is formed between the first chamber 124 in the expanded and deployed state and the driver airbag cushion 104.

The space S2 is formed between the first chamber 124 of the curtain airbag cushion 106 and the steering wheel 108 in the vehicle width direction. On the other hand, the space S2 is formed in the vehicle front-rear direction so as to spread toward the front side of the vehicle when viewed from the end portion 104*a* of the driver airbag cushion 104 that protrudes further toward the vehicle outer side than the steering wheel 108.

FIG. 5(*b*) is a diagram illustrating a condition in which the occupant 134 has further moved obliquely forward to the vehicle outer side, as compared to FIG. 5(*a*). The space S2 allows the driver airbag cushion 104 to rotate while the end portion 104*a* enters the space S2, when the driver airbag cushion 104 is pushed in the forward direction of the vehicle by the occupant 134. For example, even when the head 136 of the occupant 134 initially contacts only the driver airbag cushion 104, the driver airbag cushion 104 rotates using the space S2 to guide the head 136 to also contact the curtain airbag cushion 106, and thus the head 136 can be restrained using both the driver airbag cushion 104 and the curtain airbag cushion 106.

As described above, with the airbag device 100, the head 136 of the occupant 134 can more smoothly enter between the driver airbag cushion 104 and the curtain airbag cushion 106 due to the function of the space S2. As a result, the airbag device 100 can restrain the occupant 134 while suppressing rotation of the head 136 around the neck of the occupant 134, further reducing the injury value of the occupant 134.

Note that in addition to the above-described example, as another example, when the airbag device 100 is applied to a right side seat in the front row, for example, the occupant 134 may move obliquely forward to the right side in the vehicle width direction, and the head 136 may rotate counterclockwise around the neck when viewed from above. If the driver airbag cushion 104 and the curtain airbag cushion 106 described above are applied to the right side seat, counterclockwise rotation can be reduced or eliminated and the angular velocity of the head 136 can be reduced. That is, the airbag device 100 of the present embodiment can be implemented and will exhibit its effect in the same manner on either the left side seat or the right side seat.

Modified Example

Modified examples of each of the above-described components are described below. In FIG. 6, the same codes are attached to the same structural elements as described above, and a description of the aforementioned structural elements is omitted. In the following description, components having the same name as a component already described are assumed to have the same function unless otherwise specified, even if marked with a different sign.

FIG. 6 is a view illustrating a modified example (airbag device 200) of the airbag device 100 of FIG. 4(*a*). FIG. 6(*a*) is a diagram illustrating the initial condition of the expanding and deploying of the airbag cushion, similar to FIG. 4(*a*). The airbag device 200 is different from the airbag device 100 illustrated in FIG. 4(a) and the like, in that the driver airbag cushion 202 has a cylindrical shape.

The cylindrical driver airbag cushion 202 is expanded and deployed in a state in which a bottom surface thereof is in contact with the steering wheel 108. The driver airbag cushion 202 contacts the curved portion 132 of the second chamber 126 of the curtain airbag cushion 106 on a vehicle outer side and rear side corner portion 204. Furthermore, in the airbag device 200, a gap S1 is secured between the driver airbag cushion 202 and the first chamber 124 of the curtain airbag cushion 106, and a space S2 is secured between the first chamber 124 of the curtain airbag cushion 106 and the steering wheel 108.

FIG. 6(b) illustrates a condition in which the occupant 134 has further moved obliquely forward to the vehicle outer side, as compared to FIG. 6(a). When the occupant 134 moves obliquely forward to the vehicle outer side in an oblique collision, the driver airbag cushion 202 contacts the front portion of the head 136 of the occupant 134 and the second chamber 126 of the curtain airbag cushion 106 contacts the side portion of the head 136 of the occupant 134 at substantially the same time.

FIG. 6(c) illustrates a condition in which the occupant 134 has moved even further obliquely forward to the vehicle outer side, as compared to FIG. 6(b). As described above, the gap S1 (see FIG. 6(b)) and the space S2 are formed in this modified example as well. Therefore, when the head 136 of the occupant 134 contacts the driver airbag cushion 202, a portion of the driver airbag cushion 202 enters the gap S1 and space S2 to the outer side in the vehicle width direction, and the driver airbag cushion 202 moves so as to rotate outward in the vehicle width direction.

The cylindrical driver airbag cushion 202 has flat side portions compared to a spherical shape and contacts the curtain airbag cushion 106 at a corner portion 204, allowing for greater rotational movement until the corner portion 204 contacts the first chamber 124 of the curtain airbag cushion 106 and stops.

As described above, with the airbag device 200, the reaction force that can be applied to the head 136 of the occupant 134 is reduced, and the rotation of the head 136 around the neck can be suppressed, due to the movement of the driver airbag cushion 202 in conjunction with the rotation; thus, the occupant 134 can be more favorably restrained.

FIG. 7 is a diagram illustrating the first to third modified examples of the curtain airbag cushion 106 in FIG. 2(b). FIG. 7(a) illustrates a first modified example of the curtain airbag cushion 220. The first seam portion 222 and the second seam portion 228 included in the curtain airbag cushion 220 are different in configuration from the first seam portion 128 and the second seam portion 130 of FIG. 2(b) in that they include a first annular portion 226 and a second annular portion 232, respectively.

The first seam portion 222 includes a first linear portion 224 linearly extending upward from a lower edge of the curtain airbag cushion 220, and the first annular portion 226 is formed in a state of being curved and protruding toward the vehicle front side from an upper portion of the first linear portion 224. It is possible to restrict the gas capacity between the first chamber 124 and the second chamber 126 described above by providing a first annular portion 226 in the first seam portion 222, thus widely forming a recessed portion R1 (See FIG. 3) formed in the region around the first seam portion 222.

The second seam portion 228 includes a second linear portion 230 linearly extending upward from a lower edge of the curtain airbag cushion 220, and the second annular portion 232 is formed in a state of being curved and protruding toward the vehicle rear side from an upper portion of the second linear portion 230. By providing the second seam portion 230 with the second annular portion 232, the gas capacity of the second chamber 126 can be restricted and the degree of expansion of the second chamber 126 can be adjusted such that the head 136 of the occupant 134 simultaneously contacts the curtain airbag cushion 220 and the driver airbag cushion 104 (see FIG. 4(a)).

FIG. 7(b) illustrates a second modified example of the curtain airbag cushion 240. In the first seam portion 242 included in the curtain airbag cushion 240, the first annular portion 246 protrudes from the first linear portion 244 to a greater extent toward the front side than the first annular portion 226 in FIG. 7(a). With the first seam portion 242 including the first annular portion 246, the recessed portion R1 (see FIG. 3) can be formed wider in the front-rear direction.

FIG. 7(c) illustrates a third modified example of the curtain airbag cushion 260. The first seam portion 262 included in the curtain airbag cushion 260 is formed in a vertically long circular shape. The first seam portion 262 can form a recessed portion R1 (see FIG. 3) that is wider in the front-rear direction across the vertical direction.

FIG. 8 is a diagram illustrating the fourth and fifth modified examples of the curtain airbag cushion 106 in FIG. 2(b). FIG. 8(a) illustrates a fourth modified example of the curtain airbag cushion 280. The second chamber 282 provided in the curtain airbag cushion 280 has a lower end 284 protruding downward in a semicircular shape.

The second chamber 282 extends downward to the extent that the lower end 284 overlaps the inside of the vehicle door trim 111 (see FIG. 2(a)) in the vehicle width direction. As an example, it is preferable if the second chamber 282 is expanded and deployed so as to overlap an upper end of the door trim 111 by 50 mm or more.

When the occupant 134 (see FIG. 4(c) and the like) comes into contact with the second chamber 282 from the vehicle inner side, the lower end 284 side is supported by the door trim 111 (see FIG. 2(a)), so that the reaction force is obtained from the door trim 111 and the amount of absorbed energy can be increased. Therefore, it is possible to suppress the amount discharged outside the vehicle when the occupant 134 is restrained, while also suppressing the rotational speed of the head 136 of the occupant 134. When the thickness of the second chamber 282 in the vehicle width direction is reduced by the second seam portion 130, the timing of contact with the occupant 134 can be adjusted, but the amount of absorbed energy may be reduced. Therefore, having the second chamber 282 expand and deploy while overlapping the door trim 111 is extremely beneficial in terms of occupant protection.

FIG. 8(b) is a diagram illustrating a fifth modified example of the curtain airbag cushion 300. The first chamber 302 included in the curtain airbag cushion 300 extends downward to an extent that the lower end 304 overlaps the inner side in the vehicle width direction of the door trim 111 (see FIG. 2(a)) of the vehicle. The lower end 304 side and the first chamber 302 are supported by the door trim 111, so it is possible to suppress the amount discharged outside the vehicle when the occupant 134 is restrained. Furthermore, by providing the first chamber 302, the curtain airbag cushion 300 can suppress the amount discharged outside the vehicle when the occupant 134 (see FIG. 4(c) and the like) is restrained.

FIG. 9 is a diagram illustrating the sixth to eighth modified examples of the curtain airbag cushion 106 in FIG. 2(*b*). FIG. 9(*a*) is a diagram illustrating a sixth modified example of the curtain airbag cushion 320. The second chamber 322 provided in the curtain airbag cushion 320 has a lower end 324 protruding downward in a rectangular shape. Also in the second chamber 322, the lower end 324 overlaps with the inner side in the vehicle width direction of the door trim 111 (see FIG. 2(*a*)) of the vehicle, and it is possible to suppress the rotational speed of the head 136 of the occupant 134 while suppressing the amount discharged outside the vehicle when the occupant 134 (see FIG. 4(*c*)) is restrained.

FIG. 9(*b*) is a diagram illustrating a seventh modified example of the curtain airbag cushion 340. The second chamber 342 included in the curtain airbag cushion 340 has an extension portion 344 that protrudes downward from a front side half and expands and deploys so as to overlap the door trim 111 (see FIG. 2(*a*)). The extension portion 344 also allows the second chamber 322 to obtain a reaction force from the door trim 111 to increase the amount of absorbed energy and reduce the amount discharged outside the vehicle when restraining the occupant 134 (see FIG. 4(*c*)), while also reducing the rotational speed of the head 136 of the occupant 134.

FIG. 9(*c*) is a diagram illustrating an eighth modified example of the curtain airbag cushion 360. The second chamber 362 included in the curtain airbag cushion has an extension portion 364 that protrudes downward from the center side and is expanded and deployed so as to overlap the door trim 111 (see FIG. 2(*a*)). Furthermore, the extension portion 364 also allows the second chamber 362 to obtain a reaction force from the door trim 111 in order to increase the amount of absorbed energy and reduce the amount discharged outside the vehicle when restraining the occupant 134 (see FIG. 4(*c*)), while also reducing the rotational speed of the head 136 of the occupant 134.

FIG. 10 is a diagram illustrating the ninth modified example of the curtain airbag cushion in FIG. 2(*b*). The curtain airbag cushion 380 differs in configuration from the curtain airbag cushion 106 in FIG. 2(*b*) in that the first seam portion 382 is formed by a woven tether 384 provided on the inside.

The woven tether 384 is formed by extending a plurality of tethers (see tethers 384*a* and 384*b* in FIG. 10(*b*)) provided in the vehicle front-rear direction in a polygonal line shape in the vertical direction, so as to be alternately connected to the inner panel 138 and the outer panel 140 of the curtain airbag cushion 106.

FIG. 10(*b*) is a cross-sectional view along line B-B of the curtain airbag cushion 380 of FIG. 10(*a*). The woven tether 384 connects the inner panel 138 and the outer panel 140 of the curtain airbag cushion 106 at a plurality of locations in the vertical direction (for example, the joining portion 386) while a plurality of tethers 384*a*, 384*b* intersect each other a plurality of times when viewed in the vehicle front-rear direction.

The first seam portion 382 is formed as a region in which the outer panel 140 and the inner panel 138 are mutually connected by the woven tether 384 so as to restrict the inflow of gas. The first seam portion 382 is capable of expanding to a certain extent while maintaining a recessed state due to the restriction of the inflow amount of the gas, and is capable of exhibiting the load absorption of the occupant. Therefore, the curtain airbag cushion 380 can suitably protect the occupant across a wide range including the first seam portion 382.

FIG. 11 is a view illustrating a modified example (airbag device 400) of the airbag device 100 of FIG. 1(*b*). FIG. 11(*a*) illustrates a front row left side driver's seat 102 as viewed from the vehicle inner side. The airbag device 400 includes a driver airbag cushion 104 and a curtain airbag cushion 402.

The second chamber 404 of the curtain airbag cushion 402 is provided between the steering wheel 108 and the seatback 103 of the driver's seat 102 in the vehicle front-rear direction. With this configuration, the second chamber 404 can suitably restrain the head 136 of the occupant 134.

FIG. 11(*b*) is a diagram illustrating only the driver airbag cushion 104 of FIG. 11(*a*). The driver airbag cushion 104 expands and deploys into a somewhat flattened spherical shape while contacting the rim 109 of the steering wheel 108.

FIG. 12 and FIG. 13 are diagrams illustrating the process of restraining an occupant using cross-sectional views of the airbag device 400 in FIG. 11(*a*). FIGS. 12(*a*) to 12(*c*) illustrate cross sections at time intervals of 50 ms (milliseconds) from the start of the movement of the airbag device 400.

FIG. 12(*a*) is a cross-sectional view along line C-C of the side airbag device 400 in FIG. 11(*a*). The curtain airbag cushion 402 of the airbag device 400 is configured such that the expansion and deployment of the second chamber 404 is completed earlier than the expansion and deployment of the driver airbag cushion 104. This allows the second chamber 404 to laterally contact the head 136 of the occupant 134 prior to the occupant 134 contacting the driver airbag cushion 104, for example.

FIG. 12(*b*) is a cross-sectional view along line D-D of the airbag device 400 in FIG. 11(*a*). The E-E cross section is a horizontal cross section at a position lower than the C-C cross section. With the airbag device 400, the driver airbag cushion 104 is in contact with the curved portion 406 of the second chamber 404 and forms a gap S1 with the first chamber 408.

Furthermore, a space S2 is formed between the first chamber 408 and the steering wheel 108.

FIG. 12(*c*) is a cross-sectional view along line E-E of the airbag device 400 in FIG. 11(*a*). The E-E cross section is a horizontal cross section at a position even lower than the D-D cross section. As described above, a gap S1 is formed between the driver airbag cushion 104 and the first chamber 408, and a space S2 is formed between the first chamber 408 and the steering wheel 108.

FIGS. 12(*d*) to 12(*f*) illustrate cross sections at time intervals of 60 ms (milliseconds) from the start of the movement of the airbag device 400. FIG. 12(*d*) is a diagram illustrating the state of restraining an occupant, continuing from FIG. 12(*a*). As described above, the second chamber 404 of the curtain airbag cushion 402 laterally contacts the head 136 of the occupant 134 prior to the driver airbag cushion 104, thereby suppressing rotation of the head 136.

FIG. 12(*e*) is a diagram illustrating the state of restraining an occupant, continuing from FIG. 12(*b*). The center side of the driver airbag cushion 104 is largely expanded, and the head 136 of the occupant 134 comes into contact with the driver airbag cushion 104 from a slightly lower side than the center.

FIG. 12(*f*) is a diagram illustrating the state of restraining an occupant, continuing from FIG. 12(*c*). The head 136 of the occupant 134 comes into contact with the driver airbag cushion 104 in FIG. 12(*e*), therefore, the lower side of the driver airbag cushion 104 illustrated in FIG. 12(*f*) is also slightly pushed forward and downward.

FIGS. 13(a) to 13(c) illustrate cross sections at time intervals of 70 ms (milliseconds) from the start of the movement of the airbag device 400. FIG. 13(a) is a diagram illustrating the state of restraining an occupant, continuing from FIG. 12(d). In the airbag device 400, the second chamber 404 of the curtain airbag cushion 402 first comes into contact with the head 136 of the occupant 134 from the side, and therefore rotation of the head 136 can be suppressed when the driver airbag cushion 104 restrains the head 136 from the front. Therefore, it is possible to suitably reduce the injury value of the occupant 134.

FIG. 13(b) is a diagram illustrating the state of restraining an occupant, continuing from FIG. 12(e). When the driver airbag cushion 104 is rotated outward in the vehicle width direction around the center portion 110 of the steering wheel 108 (see FIG. 1(a)) as a fulcrum, the driver airbag cushion 104 can slide while remaining in contact with the second chamber 404, and will come into contact with the first chamber 408, similar to the description made with reference to FIG. 4(c). The reaction force that can be applied to the head 136 of the occupant 134 is reduced, and the rotation of the head 136 around the neck can be suppressed, due to the movement of the driver airbag cushion 104 in conjunction with the rotation.

FIG. 13(c) is a diagram illustrating the state of restraining an occupant, continuing from FIG. 12(f). As described in reference to FIG. 5(b), the driver airbag cushion 104 can rotate while the end portion 104a enters the space S2, when the driver airbag cushion 104 is pushed in the forward direction of the vehicle by the occupant 134. Thus, with the airbag device 400 as well, the head 136 can be restrained by using both the driver airbag cushion 104 and the curtain airbag cushion 402.

FIGS. 13(d) to 13(f) illustrate cross sections at a time interval of 80 ms (milliseconds) from the start of the movement of the airbag device 400. FIG. 13(d) is a diagram illustrating the state of restraining an occupant, continuing from FIG. 13(a). The occupant 134 is restrained while the rotation of the head portion 136 is suppressed by the action of the driver airbag cushion 104 and the curtain airbag cushion 402 described above, while moving obliquely forward to the vehicle outer side.

FIG. 13(e) is a diagram illustrating the state of restraining an occupant, continuing from FIG. 13(b). Furthermore, with the airbag device 400, the movement of the head 136 of the occupant 134 can be aligned with the movement of the shoulder or the like. In other words, with the airbag device 400, the occupant 134 can be restrained by greatly reducing or eliminating the rotation of the head 136 of the occupant 136 turning right and left with respect to the shoulder or the like, and the rotation of the head 134 tilting up and down or right and left.

FIG. 13(f) is a diagram illustrating the state of restraining an occupant, continuing from FIG. 13(c). With the airbag device 400, the rotation of the head portion 136 around the neck of the occupant 134 can be suppressed, thereby the injury value of the occupant 134 is reduced, and the occupant 134 can be restrained.

As described above, with the airbag device 400, the head 136 can be restrained from a plurality of directions using both the driver airbag cushion 104 and the curtain airbag cushion 402, while reducing the angular velocity of the head 136, in order to efficiently reduce the injury value of the occupant 134.

FIG. 14 is a diagram illustrating a modified example (airbag device 420) of the airbag device 100 of FIG. 6. FIG. 14(a) illustrates a front row left side driver's seat as viewed from the vehicle inner side. The airbag device 420 includes a cylindrical driver airbag cushion 202 and a curtain airbag cushion 402.

FIG. 14(b) is a diagram illustrating only the driver airbag cushion 202 of FIG. 14(a). The driver airbag cushion 202 expands and deploys into a cylindrical shape while contacting the rim 109 of the steering wheel 108.

FIG. 15 and FIG. 16 are diagrams illustrating the process of restraining an occupant using cross-sectional views of the airbag device 420 in FIG. 14(a). FIGS. 15(a) to 15(c) illustrate cross sections at time intervals of 50 ms (milliseconds) from the start of the movement of the airbag device 420.

FIG. 15(a) is a cross-sectional view along line F-F of the airbag device 420 of FIG. 14(a). The curtain airbag cushion 402 of the airbag device 420 is configured such that the expansion and deployment of the second chamber 404 is completed earlier than the expansion and deployment of the driver airbag cushion 202. This allows the second chamber 404 to laterally contact the head 136 of the occupant 134 prior to the occupant 134 contacting the driver airbag cushion 202, for example.

FIG. 15(b) is a cross-sectional view along line G-G of the airbag device 420 in FIG. 14(a). The G-G cross section is a horizontal cross section at a position lower than the F-F cross section. With the airbag device 420 as well, the rear side end portion of the driver airbag cushion 202 is in contact with the curved portion 406 of the second chamber 404, and forms a gap S1 with the first chamber 408. Furthermore, a space S2 is formed between the first chamber 408 and the steering wheel 108.

FIG. 15(c) is a cross-sectional view along line H-H of the airbag device 420 in FIG. 14(a). The H-H cross section is a cross section in the horizontal direction at a position lower than the G-G cross section. As described above, a gap S1 is formed between the driver airbag cushion 202 and the first chamber 408, and a space S2 is formed between the first chamber 408 and the steering wheel 108.

FIGS. 15(d) to 15(f) illustrate cross sections at a time interval of 60 ms (milliseconds) from the start of the movement of the airbag device 420. FIG. 15(d) is a diagram illustrating the state of restraining an occupant, continuing from FIG. 15(a). As described above, the second chamber 404 of the curtain airbag cushion 402 laterally contacts the head 136 of the occupant 134 prior to the driver airbag cushion 202, thereby suppressing rotation of the head 136.

FIG. 15(e) is a diagram illustrating the state of restraining an occupant, continuing from FIG. 15(b). The center side of the driver airbag cushion 202 is largely expanded, and the head 136 of the occupant 134 comes into contact with the driver airbag cushion 202 from a slightly lower side than the center.

FIG. 15(f) is a diagram illustrating the state of restraining an occupant, continuing from FIG. 15(c). The head 136 of the occupant 134 comes into contact with the driver airbag cushion 202 in FIG. 15(e), and therefore the lower side of the driver airbag cushion 202 illustrated in FIG. 15(f) is also slightly pushed forward and downward.

FIGS. 16(a) to 16(c) illustrate cross sections at time intervals of 70 ms (milliseconds) from the start of the movement of the airbag device 420. FIG. 16(a) is a diagram illustrating the state of restraining an occupant, continuing from FIG. 15(d). In the airbag device 420, the second chamber 404 of the curtain airbag cushion 402 first comes into contact with the head 136 of the occupant 134 first from the side; therefore, rotation of the head 136 can be suppressed when the driver airbag cushion 202 restrains the head 136 from the front. Therefore, it is possible to suitably reduce the injury value of the occupant 134.

FIG. 16(b) is a diagram illustrating the state of restraining an occupant, continuing from FIG. 15(e). When the driver airbag cushion 202 is rotated outward in the vehicle width direction around the center portion 110 of the steering wheel 108 (see FIG. 1(a)) as a fulcrum, the driver airbag cushion 202 can slide while remaining in contact with the second chamber 404 and come into contact with the first chamber 408, similar to the description made with reference to FIG. 4(c). The reaction force that can be applied to the head 136 of the occupant 134 is reduced, and the rotation of the head 136 around the neck can be suppressed, due to the movement of the driver airbag cushion 202 in conjunction with the rotation.

FIG. 16(c) is a diagram illustrating the state of restraining an occupant, continuing from FIG. 15(f). As described in reference to FIG. 5(b), the driver airbag cushion 202 can rotate while the end portion 202a enters the space S2, when the driver airbag cushion 202 is pushed in the forward direction of the vehicle by the occupant 134. Thus, with the airbag device 420 as well, the head 136 can be restrained by using both the driver airbag cushion 202 and the curtain airbag cushion 402.

FIGS. 16(d) to 16(f) illustrate cross sections at a time interval of 80 ms (milliseconds) from the start of the movement of the airbag device 420. FIG. 16(d) is a diagram illustrating the state of restraining an occupant, continuing from FIG. 16(a). The head 136 of the occupant 134 is restrained while the rotation of the head portion 136 is suppressed by the action of the driver airbag cushion 202 and the curtain airbag cushion 402 described above, while moving obliquely forward to the vehicle outer side.

FIG. 16(e) is a diagram illustrating the state of restraining an occupant, continuing from FIG. 16(b). The airbag device 100 can align the movements of the head 136 and the shoulders and the like of the occupant 134 by the above-described action, and restrains by greatly reducing or eliminating the rotation of the head 136 turning to the left or right with respect to the shoulders, as well as the rotation of the head 136 up or down or to the left or right.

FIG. 16(f) is a diagram illustrating the state of restraining an occupant, continuing from FIG. 16(c). With the airbag device 420, the rotation of the head portion 136 around the neck of the occupant 134 can be suppressed, thereby the injury value of the occupant 134 is reduced, and the occupant 134 can be restrained.

As described above, the airbag device 420 restrains the head 136 from a plurality of directions using both the driver airbag cushion 202 and the curtain airbag cushion 106, and reduces the angular velocity of the head 136 in order to efficiently suppress the injury value of the occupant 134.

FIG. 17 is a diagram illustrating a modified example (airbag device 440) of the airbag device 100 of FIG. 6. FIG. 17(a) illustrates a front row left side driver's seat 102 as viewed from the vehicle inner side. The airbag device 440 includes a truncated cone shaped driver airbag cushion 442 and a curtain airbag cushion 400.

FIG. 17(b) is a diagram illustrating only the driver airbag cushion 442 of FIG. 17(a). The driver airbag cushion 442 expands and deploys in a truncated cone shape while the top surface 444 is in contact with the rim 109 of the steering wheel 108.

FIG. 18 and FIG. 19 are diagrams illustrating the process of restraining an occupant using cross-sectional views of the airbag device 440 in FIG. 17(a). FIGS. 18(a) to 18(c) illustrate cross sections at time intervals of 50 ms (milliseconds) from the start of the movement of the airbag device 440.

FIG. 18(a) is a cross-sectional view along line I-I of the airbag device 440 of FIG. 17(a). The curtain airbag cushion 402 of the airbag device 440 is configured such that the expansion and deployment of the second chamber 404 is completed earlier than the expansion and deployment of the driver airbag cushion 442. This allows the second chamber 404 to laterally contact the head 136 of the occupant 134 prior to the occupant 134 contacting the driver airbag cushion 442, for example.

FIG. 18(b) is a cross-sectional view along line J-J of the airbag device 440 in FIG. 17(a). The J-J cross section is a horizontal cross section at a position lower than the I-I cross section. With the airbag device 440 as well, the rear side end portion of the driver airbag cushion 442 is in contact with the curved portion 406 of the second chamber 404, and forms a gap S1 with the first chamber 408. Furthermore, a space S2 is formed between the first chamber 408 and the steering wheel 108.

FIG. 18(c) is a cross-sectional view along line K-K of the airbag device 440 in FIG. 17(a). The K-K cross section is a cross section in the horizontal direction at a position lower than the J-J cross section. As described above, a gap S1 is formed between the driver airbag cushion 442 and the first chamber 408, and a space S2 is formed between the first chamber 408 and the steering wheel 108.

FIGS. 18(d) to 18(f) illustrate cross sections at a time interval of 60 ms (milliseconds) from the start of the movement of the airbag device 440. FIG. 18(d) is a diagram illustrating the state of restraining an occupant, continuing from FIG. 18(a). As described above, the second chamber 404 of the curtain airbag cushion 402 laterally contacts the head 136 of the occupant 134 prior to the driver airbag cushion 442, thereby suppressing rotation of the head 136.

FIG. 18(e) is a diagram illustrating the state of restraining an occupant, continuing from FIG. 18(b). The center side of the driver airbag cushion 442 is largely expanded, and the head 136 of the occupant 134 comes into contact with the driver airbag cushion 442 from a slightly lower side than the center.

FIG. 18(f) is a diagram illustrating the state of restraining an occupant, continuing from FIG. 18(c). The head 136 of the occupant 134 comes into contact with the driver airbag cushion 442 in FIG. 18(e), and therefore, the lower side of the driver airbag cushion 442 illustrated in FIG. 18(f) is also slightly pushed forward and downward.

FIGS. 19(a) to 19(c) illustrate cross sections at time intervals of 70 ms (milliseconds) from the start of the movement of the airbag device 440. FIG. 19(a) is a diagram illustrating the state of restraining an occupant, continuing from FIG. 18(d). In the airbag device 440, the second chamber 404 of the curtain airbag cushion 402 comes into contact with the head 136 of the occupant 134 from the side; therefore, rotation of the head 136 can be suppressed when the driver airbag cushion 442 restrains the head 136 from the front. Therefore, it is possible to suitably reduce the injury value of the occupant 134.

FIG. 19(b) is a diagram illustrating the state of restraining an occupant, continuing from FIG. 18(e). When the driver airbag cushion 442 is rotated outward in the vehicle width direction around the center portion 110 of the steering wheel 108 as a fulcrum, the driver airbag cushion 442 can slide while remaining in contact with the second chamber 404 and come into contact with the first chamber 408, similar to the description made with reference to FIG. 4(c). The reaction force that can be applied to the head 136 of the occupant 134 is reduced, and the rotation of the head 136 around the neck can be suppressed, due to the movement of the driver airbag cushion 442 in conjunction with the rotation.

FIG. 19(*c*) is a diagram illustrating the state of restraining an occupant, continuing from FIG. 18(*e*). As described in reference to FIG. 5(*b*), the driver airbag cushion 442 can rotate while the end portion 442*a* enters the space S2, when the driver airbag cushion 442 is pushed in the forward direction of the vehicle by the occupant 134. Thus, with the airbag device 440 as well, the head 136 can be restrained by using both the driver airbag cushion 442 and the curtain airbag cushion 106.

FIGS. 19(*d*) to 19(*f*) illustrate cross sections at a time interval of 80 ms (milliseconds) from the start of the movement of the airbag device 440. FIG. 19(*d*) is a diagram illustrating the state of restraining an occupant, continuing from FIG. 19(*a*). The head 136 of the occupant 134 is restrained while the rotation of the head portion is suppressed by the action of the driver airbag cushion 442 and the curtain airbag cushion 402 described above, while moving obliquely forward to the vehicle outer side.

FIG. 19(*e*) is a diagram illustrating the state of restraining an occupant, continuing from FIG. 19(*b*). Furthermore, with the airbag device 440, the movement of the head 136 of the occupant 134 can be aligned with the movement of the shoulder or the like. In other words, with the airbag device 440, the occupant 134 can be restrained by greatly reducing or eliminating the rotation of the head 136 turning right and left with respect to the shoulder or the like, and the rotation of the head 136 tilting up and down or right and left.

FIG. 19(*f*) is a diagram illustrating the state of restraining an occupant, continuing from FIG. 19(*c*). With the airbag device 440, the rotation of the head portion 136 around the neck of the occupant 134 can be suppressed, and thereby the injury value of the occupant 134 is reduced, and the occupant 134 can be restrained.

As described above, the airbag device 440 restrains the head 136 from a plurality of directions using both the driver airbag cushion 442 and the curtain airbag cushion 106, and reduces the angular velocity of the head 136 in order to efficiently suppress the injury value of the occupant 134.

FIG. 20 is a diagram illustrating a modified example (airbag device 460) of the airbag device 100 of FIG. 5. FIG. 20(*a*) illustrates the initial state of the expanded and deployed airbag device 460. In the airbag device 460, the steering wheel 108 can move forward along the column shaft 462 that supports the steering wheel 108.

FIG. 20(*b*) is a diagram illustrating a condition where the airbag device 460 of FIG. 20*a* restrains an occupant 134. When a load is applied to the steering wheel 108, the column shaft 462 deforms so as to shrink, and thus the impact when the occupant 134 comes into contact with the driver airbag cushion 104 can be reduced. At this time, the steering wheel 108 can move forward by a predetermined distance while forming a space S2 between the steering wheel 108 and the first chamber 124 of the curtain airbag cushion 106.

As described with reference to FIG. 5(*b*), the space S2 is formed, so the driver airbag cushion 104 can move so as to rotate outward in the vehicle width direction when contacting the head 136 of the occupant 134. Therefore, with the airbag device 460, it is possible to restrain the occupant 134 while reducing the injury value by providing the space S2 and suppressing rotation of the head 136 of the occupant 134 around the neck while suppressing the load applied to the occupant 134 by contraction of the column shaft 462.

FIG. 21 is a diagram illustrating the modified examples of the curtain airbag cushion 106 in FIG. 2(*b*). FIG. 21(*a*) illustrates a modified example of the curtain airbag cushion 480.

The second chamber 126 of the curtain airbag cushion 480 is provided between the steering wheel 108 (see FIG. 11(*a*)) and the seatback 103 of the driver's seat 102 in the vehicle front-rear direction. With this configuration, the second chamber 126 can suitably restrain the head 136 of the occupant 134.

Two second seam portions are provided within the range of the second chamber 126. The second seam portion 130 and the second seam portion 482 are formed so as to extend in the vertical direction continuously from the lower edge 484 of the curtain airbag cushion 480 with a dimension shorter than that of the first seam portion 128. With the second seam portions 130, 482, it is possible to adjust the thickness of the second chamber 126 in the vehicle width direction, and adjust the timing at which the second chamber 126 comes into contact with the head 136 of the occupant 134 (see FIG. 11(*a*)), and the like.

FIG. 21(*b*) illustrates a modified example of the curtain airbag cushion 500. The curtain airbag cushion 500 is provided with a second seam portion 502 within the range of the second chamber 126. The second seam portion 502 is circular and is formed at a point separated from the lower edge 504 and the upper edge 506 of the second chamber 126.

With the second seam portion 502 of this configuration, it is possible to adjust the thickness of the second chamber 126 in the vehicle width direction, and adjust the timing at which the second chamber 126 comes into contact with the head 136 of the occupant 134 (see FIG. 11(*a*)), and the like. Note that the second seam portion 502 can be provided as a non-expandable region having various shapes such as a triangular shape or a quadrangular shape, in addition to a circular shape.

FIG. 21(*c*) illustrates a modified example of the curtain airbag cushion 520. The curtain airbag cushion 520 is provided with two second seam portions 502, 522 within the range of the second chamber 126. The second seam portion 522 is also circular and is formed at a point separated from the lower edge 504 and the upper edge 506 of the second chamber 126. By providing two second seam portions 502, 522, it is possible to more efficiently adjust the thickness of the second chamber 126 in the vehicle width direction, and adjust the timing at which the second chamber 126 comes into contact with the head 136 of the occupant 134 (see FIG. 11(*a*)), and the like.

FIG. 22 is a diagram illustrating the modified examples of the curtain airbag cushion 106 in FIG. 2(*b*). FIG. 22(*a*) illustrates a modified example of the curtain airbag cushion 540.

The second seam portion 542 is also circular and is formed at a point separated from the lower edge 504 and the upper edge 506 of the second chamber 126. The second seam portion 542 includes a front-rear linear portion 544 formed to extend in the vehicle front-rear direction and annular portions 546*a*, 546*b* formed at both ends of the front-rear linear portion 544. With the second seam portion 542 of this configuration, it is possible to adjust the thickness of the second chamber 126 in the vehicle width direction, and adjust the timing at which the second chamber 126 comes into contact with the head 136 of the occupant 134 (see FIG. 11(*a*)), and the like.

FIG. 22(*b*) illustrates a modified example of the curtain airbag cushion 560. The second seam portion 562 includes a vertical linear portion 564 continuously extending upward from a lower edge 504 of the second chamber 126, a front-rear linear portion 566 formed in a state of extending toward the rear of the vehicle from the vertical linear portion 564, and an annular portion 568. With the second seam portion 562 of this configuration, it is possible to adjust the thickness of the second chamber 126 in the vehicle width direction, and adjust the timing at which the second chamber 126 comes into contact with the head 136 of the occupant 134 (see FIG. 11(*a*)), and the like.

FIG. 22(*c*) illustrates a modified example of the curtain airbag cushion 580. The second seam portion 582 includes a vertical linear portion 584 continuously extending upward from a lower edge 504 of the second chamber 126, a front-rear linear portion 586 formed in a state of extending toward the front of the vehicle from the vertical linear portion 584, and an annular portion 588. With the second seam portion 582 of this configuration, it is possible to adjust the thickness of the second chamber 126 in the vehicle width direction, and adjust the timing at which the second chamber 126 comes into contact with the head 136 of the occupant 134 (see FIG. 11(*a*)), and the like.

FIG. 23 is a diagram illustrating the modified examples of the curtain airbag cushion 106 in FIG. 2(*b*). FIG. 23(*a*) illustrates a modified example of the curtain airbag cushion 600.

The curtain airbag cushion 600 is provided with a second seam portion 602 within the range of the second chamber 126. The second seam portion 602 includes a front-rear linear portion 604 formed to extend in the vehicle front-rear direction and annular portions 606*a*, 606*b* that curve upward at both ends of the front-rear linear portion 604.

The second seam portion 602 is provided at a point separated from the lower edge 504 and the upper edge 506 of the second chamber 126, and above a position where the head 136 of the occupant 134 comes into contact with the lower second seam portion 130. With this configuration, it is possible to efficiently adjust the thickness of the second chamber 126 in the vehicle width direction, between the upper second seam portion 602 and the lower side second seam portion 130, and adjust the timing at which the second chamber 126 comes into contact with the head 136 of the occupant 134, and the like. This configuration can be used in a curtain airbag cushion installed in a vehicle having a particularly high ceiling.

FIG. 23(*b*) illustrates a modified example of the curtain airbag cushion 620. The second seam portion 622 included in the curtain airbag cushion 620 has substantially the same configuration as the second seam portion 602 (see FIG. 23(*a*)), and includes annular portions 624*a* and 624*b* that curve downward at both ends of the front-rear linear portion 604. With this configuration, it is possible to efficiently adjust the thickness of the second chamber 126 in the vehicle width direction between the upper second seam portion 622 and the lower side second seam portion 130, and adjust the timing at which the second chamber 126 comes into contact with the head 136 of the occupant 134, and the like.

FIG. 23(*c*) illustrates a modified example of the curtain airbag cushion 640. The curtain airbag cushion 640 is provided with a second seam portion 642 within the range of the second chamber 126. The second seam portion 642 is elliptical extending in the front-rear direction of the vehicle, and is formed at a point separated from the lower edge 504 and the upper edge 506 of the second chamber 126. With this configuration as well, it is possible to efficiently adjust the thickness of the second chamber 126 in the vehicle width direction, between the upper second seam portion 642 and the lower side second seam portion 130, and adjust the timing at which the second chamber 126 comes into contact with the head 136 of the occupant 134, and the like.

FIG. 24 is a diagram illustrating the modified examples of the curtain airbag cushion 106 in FIG. 2(*b*). FIG. 24(*a*) illustrates a modified example of the curtain airbag cushion 660. The curtain airbag cushion 660 has a non-expandable portion 662 below the second chamber 126 as a modified example of the second seam portion 130 (see FIG. 2(*b*)).

Specifically, a first seam portion 128 is provided between the front side of the second chamber 126 and the first chamber 124. A delay chamber 664, which expands at a slower timing than the second chamber 126, is located behind the second chamber 126, and a delay seam 666 is provided between the delay chamber 664 and the second chamber 126. The non-expandable portion 662 is formed by a non-expandable region extending from the first seam portion 128 on the lower side within the range of the second chamber 126 to the delay seam 666.

It is possible to efficiently adjust the thickness of the second chamber 126 in the region above the non-expandable portion 662 in the vehicle width direction by providing the non-expandable portion 662, and adjust the timing at which the second chamber 126 comes into contact with the head 136 of the occupant 134 (see FIG. 11(*a*)), and the like.

FIG. 24(*b*) illustrates a modified example of the curtain airbag cushion 680. The curtain airbag cushion 680 has a protruding portion 682 that protrudes upward within the range of the second chamber 126. The protruding portion 682 is formed by extending the upper end of the expandable region of the second chamber 126 upward. The protruding portion 682 enables the curtain airbag cushion 680 to restrain the head 136 of the occupant 134 (see FIG. 11(*a*)) with a thicker part in the vehicle width direction, even if the cushion is installed in a vehicle with a low ceiling.

FIG. 25 is a diagram illustrating the modified examples of the curtain airbag cushion 106 in FIG. 2(*b*). FIG. 25(*a*) illustrates a modified example of the curtain airbag cushion 700.

The first seam portion 702, similar to the first seam portion 128 in FIG. 2(*b*), is provided as a non-expandable region connecting the outer panel 140 (see FIG. 3) and the inner panel 138. In particular, the first seam portion 702 connects regions of the outer panel 140 and the inner panel 138 that extend in the vertical direction and have a predetermined dimension in the vehicle front-rear direction.

The gas capacity between the first chamber 124 and the second chamber 126 can be restricted by the first seam portion 702 having the above-described configuration, and the region around the first seam portion 702 can be widely recessed. As a result, it is possible to obtain effects such as adjusting the thicknesses of the second chambers 126 in the vehicle width direction, and facilitating the formation of the gap S1 (see FIG. 3), causing the driver airbag cushion 104 to rotate.

FIG. 25(*b*) illustrates a modified example of the curtain airbag cushion 720. In the curtain airbag cushion 720, the lower end of the first chamber 302 and the second chamber 282 overlap the door trim 111 (see FIG. 2(*a*)) in the inner side of the vehicle width direction, as described in FIG. 8(*b*).

When the occupant 134 (see FIG. 4(*c*) and the like) comes into contact with the first chamber 302 and the second chamber 282 from the vehicle inner side, the lower end 284 side is supported by the door trim 111 (see FIG. 2(*a*)), so that the reaction force is obtained from the door trim 111 and the amount of absorbed energy can be increased. As a result, it is possible to obtain effects such as adjusting the thicknesses of the first chamber 302 and the second chamber 282 in the vehicle width direction by providing the first seam portion 702, and facilitating the formation of the gap S1 (see FIG. 3), causing the driver airbag cushion 104 to rotate.

FIG. 26 is a diagram illustrating the modified examples of the curtain airbag cushion 106 in FIG. 2(b). FIG. 26(a) illustrates a modified example of the curtain airbag cushion 740.

The first seam portion 742 is formed as a vertically elliptical-shaped non-expandable portion of the curtain airbag cushion 740, separated from the upper edge 744 and lower edge 746 of the curtain airbag cushion 740. With this configuration, it is possible to obtain effects such as adjusting the thicknesses of the first chamber 302 and the second chamber 282 in the vehicle width direction while increasing the amount of absorbed energy by providing a reaction force from the door trim 111 (see FIG. 2(a)), in conjunction with the first chamber 302 and the second chamber 282, and facilitating the formation of the gap S1 (see FIG. 3), causing the driver airbag cushion 104 to rotate.

FIG. 26(b) illustrates a modified example of the curtain airbag cushion 760. In the curtain airbag 760, the first seam portion 764 is provided so as to extend continuously downward from the upper edge 762. This configuration can also restrict the inflow amount of gas in the first chamber 302 and the second chamber 282, and adjust the thickness of the first chambers 302 in the vehicle width direction to help enhance the occupant restraint force.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which is understood to naturally belong to the technical scope of the present invention.

INDUSTRIAL APPLICABILITY

The present invention can be used as an airbag device for restraining an occupant seated in the driver's seat of a vehicle.

DESCRIPTION OF CODES

100: Airbag device, 102: Driver's seat, 103: Seatback, 104: Driver airbag cushion, 104a: End portion, 106: Curtain airbag cushion, 108: Steering wheel, 109: Rim, 110: Center portion, 111: Door trim, 112: Side window, 114: Roof side rail, 116: Tab, 118: Inflator, 120: Strap, 122: A-pillar, 124: First chamber, 126: Second chamber, 128: First seam portion, 130: Second seam portion, 132: Curved portion, 134: Occupant, 136: Head, 138: Inner panel, 140: Outer panel, E1: Range, R1: Recessed portion, S1: Gap, S2: Space, 200: First modified example of airbag device, 202: Driver airbag cushion, 202a: End portion, 204: Corner portion, 220: First modified example of curtain airbag cushion, 222 First seam portion, 224: First linear portion, 226: First annular portion, 228: Second seam portion, 230: Second linear portion, 232: Second annular portion, 240: Second modified example of curtain airbag cushion, 242: First seam portion, 244: First linear portion, 246: First annular portion, 260: Third modified example of curtain airbag cushion, 262: First seam portion, 280: Fourth modified example of curtain airbag cushion, 282: Second chamber, 284 Lower end, 300: Fifth modified example of curtain airbag cushion, 302: First chamber, 304: Lower end, 320: Sixth modified example of curtain airbag cushion 322: Second chamber, 324: Lower end, 340: Seventh modified example of curtain airbag cushion, 342: Second chamber, 344: Extension portion, 360: Eighth modified example of curtain airbag cushion, 362: Second chamber, 364: Extension portion, 380: Curtain airbag cushion, 382: First seam portion, 384: Woven tether, 384a, 384b: Tether, 386: Joining portion, 400: Airbag device, 402: Curtain airbag cushion, 404: Second chamber, 406: Curved portion, 408: First chamber, 420: Airbag device, 440: Airbag device, 442: Driver airbag cushion, 442a: End portion, 444: Top surface, 460: Airbag device, 462: Column shaft, 480: Curtain airbag cushion, 482: Second seam portion, 484: lower edge, 500: Curtain airbag cushion, 502: Second seam portion, 504: Lower edge, 506: Upper edge, 520: Curtain airbag cushion, 522: Second seam portion, 540: Curtain airbag cushion, 542: Second seam portion, 544: Front-rear linear portion, 546a, 546b: Annular portion, 560: Curtain airbag cushion, 562: Second seam portion, 564: Vertical linear portion, 566: Front-rear linear portion, 568: Annular portion, 580: Curtain airbag cushion, 582: Second seam portion, 584: Vertical linear portion, 586: Front rear linear portion, 588: Annular portion, 600: Curtain airbag cushion, 602: Second seam, 604: Front rear linear portion, 606a, 606b: Annular portion, 620: Curtain airbag cushion, 622: Second seam portion, 624a, 624b: Annular portion, 640: Curtain airbag cushion, 642: Second seam portion, 660: Curtain airbag cushion, 662: Non-expandable portion, 664: Delay chamber, 666: Delay seam, 680: Curtain airbag cushion, 682: Protruding portion, 700: Curtain airbag cushion, 702: First seam portion, 720: Curtain airbag cushion, 740: Curtain airbag cushion, 742: First seam portion, 744: Upper edge, 746: Lower edge, 760: Curtain airbag cushion, 762: Upper edge, 764: First seam portion

The invention claimed is:

1. An airbag device for restraining an occupant seated in a driver's seat of a vehicle, the airbag device comprising:
a driver airbag cushion for expanding and deploying from a center portion of a steering wheel of the vehicle; and
a curtain airbag cushion for expansion and deployment in a vertical direction along a side window of the vehicle on an outer side in a vehicle width direction of the driver airbag cushion;
the curtain airbag cushion comprising:
a first seam portion formed so as to extend vertically within a range obtained by projecting the driver airbag cushion outward in the vehicle width direction, the first seam portion connecting an outer panel on an outer side of the curtain airbag cushion in the vehicle width direction and an inner panel on an inner side of the curtain airbag cushion in the vehicle width direction;
a first chamber that expands to be thicker in the vehicle width direction than the first seam portion, provided on a front side of the first seam portion; and a second chamber that expands to be thicker in the vehicle width direction than the first seam portion, provided on a rear side of the first seam portion;

wherein:

the driver airbag cushion is dexpandable and deployable in a state of being separated from the first chamber while being in contact with a curved portion of the second chamber that is curved toward the first seam portion, and the first seam portion connects regions of the outer panel and the inner panel that extend in the vertical direction and has a predetermined dimension in the vehicle front-rear direction.

2. The airbag device according to claim 1, further comprising:

a predetermined gap formed between the driver airbag cushion and the first chamber of the curtain airbag cushion;

wherein the gap is configured to be formed obliquely to a front side of a vehicle outer side when viewed from an occupant who is properly seated in the driver's seat.

3. The airbag device according to claim 1, wherein the curtain airbag cushion expands and deploys in a state in which the first chamber is separated outward in the vehicle width direction from the steering wheel; and a vehicle width direction outer side portion of the expanded and deployed driver airbag cushion is capable of entering a space between the first chamber of the curtain airbag cushion and the steering wheel when pushed forward by the occupant.

4. The airbag device according to claim 1, wherein when the driver airbag cushion is configured to rotate outward in the vehicle width direction around a center portion of the steering wheel as a fulcrum, the driver airbag cushion is configured to slide while remaining in contact with the second chamber, and the driver airbag cushion is configured to contact the first chamber.

5. The airbag device according to any one of claim 1, wherein:

the curtain airbag cushion further comprises one or a plurality of second seam portions formed within a range of the second chamber and connecting the outer panel and the inner panel; and at least one of the second seam portions is formed so as to extend in the vertical direction with a dimension shorter than that of the first seam portion.

6. The airbag device according to claim 5, wherein:

the first seam portion includes:

a first linear portion linearly extending upward from a lower edge of the curtain airbag cushion; and a first annular portion that curves and protrudes from an upper portion of the first linear portion toward the vehicle front side; and at least one of the second seam portions includes:

a second linear portion linearly extending upward from a lower edge of the curtain airbag cushion; and a second annular portion that curves and protrudes from an upper portion of the second linear portion toward the vehicle rear side.

7. The airbag device according to claim 1, wherein the first seam portion is in a state in which a plurality of tethers aligned in the vehicle front-rear direction are connected to a plurality of locations in the vertical direction of the outer panel and the inner panel while intersecting a plurality of times as viewed from the vehicle front-rear direction.

8. The airbag device according to claim 1, wherein the first seam portion is formed in a state of being separated from an upper edge and a lower edge of the curtain airbag cushion.

9. The airbag device according to claim 1, wherein the first seam portion is formed continuously from the upper edge of the curtain airbag cushion.

10. The airbag device according to claim 1, wherein a lower end of the second chamber of the curtain airbag cushion overlaps an inner side in the vehicle width direction of the door trim of the vehicle.

11. The airbag device according to claim 1, wherein a lower end of the first chamber of the curtain airbag cushion overlaps an inner side in the vehicle width direction of the door trim of the vehicle.

12. The airbag device according to claim 1, wherein the driver airbag cushion is expanded and deployed in one of a cylindrical shape having bottom surface with for contacting the steering wheel and a truncated cone shape with a top surface for contacting the steering wheel.

13. The airbag device according to claim 1, wherein the second chamber completes expansion and deployment earlier than the driver airbag cushion.

14. The airbag device according to claim 1, wherein:

the airbag device further comprising a predetermined space formed between the steering wheel and the first chamber in the vehicle width direction; and the steering wheel is movable in the forward direction by a predetermined distance along a column shaft supporting the steering wheel while forming the space.

15. The airbag device according to claim 1, wherein the second chamber is provided between the steering wheel and a seatback of the driver's seat in a vehicle front-rear direction.

16. The airbag device according to claim 1, wherein at least one of the second seam portions is formed at a point separated from a lower edge and an upper edge of the second chamber.

17. The airbag device according to claim 1, wherein at least one of the second seam portions includes a front-rear linear portion formed in a state extending in the vehicle front-rear direction.

18. The airbag device according to claim 1, wherein at least one of the second seam portions is formed as a non-expandable region having a predetermined area provided within a range of the second chamber.

19. An airbag device for restraining an occupant seated in a driver's seat of a vehicle, the airbag device comprising:

a driver airbag cushion configured to expand and deploy from a center portion of a steering wheel of the vehicle; and a curtain airbag cushion configured to expand and deploy in a vertical direction along a side window of the vehicle on an outer side in a vehicle width direction of the driver airbag cushion;

the curtain airbag cushion comprising:

a first seam portion formed so as to extend vertically within a range obtained by projecting the driver airbag cushion outward in the vehicle width direction, the first seam portion connecting an outer panel on an outer side of the curtain airbag cushion in the vehicle width direction and an inner panel on an inner side of the curtain airbag cushion in the vehicle width direction;

a first chamber that expands to be thicker in the vehicle width direction than the first seam portion, provided on a front side of the first seam portion; and a second chamber that expands to be thicker in the vehicle width direction than the first seam portion, provided on a rear side of the first seam portion;

wherein:

the driver airbag cushion is configured to expand and deploy in a state of being separated from the first chamber while being in contact with a curved portion of the second chamber that is curved toward the first seam portion, and wherein the first seam portion is formed in a state of being separated from an upper edge and a lower edge of the curtain airbag cushion.

20. An airbag device for restraining an occupant seated in a driver's seat of a vehicle, the airbag device comprising:

a driver airbag cushion configured to expand and deploy from a center portion of a steering wheel of the vehicle; and a curtain airbag cushion configured to expand and deploy in a vertical direction along a side window of the vehicle on an outer side in a vehicle width direction of the driver airbag cushion;

the curtain airbag cushion comprising:

a first seam portion formed so as to extend vertically within a range obtained by projecting the driver airbag cushion outward in the vehicle width direction, the first seam portion connecting an outer panel on an outer side of the curtain airbag cushion in the vehicle width direction and an inner panel on an inner side of the curtain airbag cushion in the vehicle width direction;

a first chamber that expands to be thicker in the vehicle width direction than the first seam portion, provided on a front side of the first seam portion; and a second chamber that expands to be thicker in the vehicle width direction than the first seam portion, provided on a rear side of the first seam portion;

wherein the driver airbag cushion is configured to expand and deploy in a state of being separated from the first chamber while being in contact with a curved portion of the second chamber that is curved toward the first seam portion, wherein the first seam portion is formed continuously from the upper edge of the curtain airbag cushion.

* * * * *